(12) United States Patent
Aljitawi et al.

(10) Patent No.: US 12,472,282 B2
(45) Date of Patent: Nov. 18, 2025

(54) BIOENGINEERED WHARTON'S JELLY DERIVED EXTRACELLULAR MATRIX

(71) Applicant: University of Rochester, Rochester, NY (US)

(72) Inventors: Omar Aljitawi, Pittsford, NY (US); Hani Awad, Rochester, NY (US); Michael Becker, Pittsford, NY (US)

(73) Assignee: University of Rochester, Rochester, NY (US)

( * ) Notice: Subject to any disclaimer, the term of this patent is extended or adjusted under 35 U.S.C. 154(b) by 1354 days.

(21) Appl. No.: 17/043,927

(22) PCT Filed: Mar. 29, 2019

(86) PCT No.: PCT/US2019/024768
§ 371 (c)(1),
(2) Date: Sep. 30, 2020

(87) PCT Pub. No.: WO2019/191548
PCT Pub. Date: Oct. 3, 2019

(65) Prior Publication Data
US 2021/0121604 A1    Apr. 29, 2021

Related U.S. Application Data

(60) Provisional application No. 62/650,551, filed on Mar. 30, 2018.

(51) Int. Cl.
| | | |
|---|---|---|
| A61L 27/38 | (2006.01) | |
| A61L 27/36 | (2006.01) | |
| A61L 27/54 | (2006.01) | |
| A61L 27/56 | (2006.01) | |
| B33Y 70/00 | (2020.01) | |
| B33Y 80/00 | (2015.01) | |
| C12N 5/0789 | (2010.01) | |
| G01N 33/50 | (2006.01) | |

(52) U.S. Cl.
CPC ....... *A61L 27/3604* (2013.01); *A61L 27/3691* (2013.01); *A61L 27/3834* (2013.01); *A61L 27/3847* (2013.01); *A61L 27/54* (2013.01); *A61L 27/56* (2013.01); *B33Y 70/00* (2014.12); *B33Y 80/00* (2014.12); *C12N 5/0647* (2013.01); *G01N 33/5011* (2013.01); *A61L 2300/414* (2013.01); *A61L 2430/02* (2013.01); *C12N 2503/02* (2013.01); *C12N 2533/90* (2013.01)

(58) Field of Classification Search
None
See application file for complete search history.

(56) References Cited

U.S. PATENT DOCUMENTS

| | | | |
|---|---|---|---|
| 8,685,732 B2 | 4/2014 | Font Perez | |
| 9,814,802 B2 | 11/2017 | Aljitawi | |
| 2011/0165676 A1 | 7/2011 | Hopkins | |
| 2011/0256186 A1* | 10/2011 | Font Perez | A61L 27/52 |
| | | | 514/56 |

FOREIGN PATENT DOCUMENTS

| | | |
|---|---|---|
| CN | 102198292 A | 9/2011 |
| CN | 102198292 B * | 6/2013 |
| CN | 107158465 | 9/2017 |
| EP | 1087756 B1 | 8/2009 |
| JP | 2012533519 A | 12/2012 |
| WO | 2018035138 A1 | 2/2018 |

OTHER PUBLICATIONS

Xiao et al. Fabrication and In Vitro Study of Tissue-Engineered Cartilage Scaffold Derived from Wharton's Jelly Extracellular Matrix (2017) BioMed Research International, pp. 1-12. (Year: 2017).*
Guo et al. Scaffolds of umbilical cord decellularized Wharton jelly for tissue engineering and preparation method thereof (2013) CN102198292B, Espacenet English Translation obtained on Apr. 4, 2025. (Year: 2013).*
Loh et al. Three-Dimensional Scaffolds for Tissue Engineering Applications: Role of Porosity and Pore Size (2013) Tissue Engineering: Part B, 19:6, pp. 485-502. (Year: 2013).*
Aljitawi OS et al., "A novel three-dimensional stromal-based model for in vitro chemotherapy sensitivity testing of leukemia cells ," Leuk Lymphoma, 2014, 55(2):378-91.
Aljitawi OS et al., "Generating CK19-positive cells with hair-like structures from Wharton's jelly mesenchymal stromal cells." Stem Cells Dev, 2013, 22(1):18-26.
Basile, P., et al., "Freeze-dried tendon allografts as tissue-engineering scaffolds for Gdf5 gene delivery," Molecular therapy : the journal of the American Society of Gene Therapy, 2008. 16(3): p. 466-73.
Cheng, N.C., et al., Chondrogenic differentiation of adipose-derived adult stem cells by a porous scaffold derived from native articular cartilage extracellular matrix. Tissue engineering Part A, 2009. 15(2): p. 231-41.

(Continued)

*Primary Examiner* — Tracy Vivlemore
*Assistant Examiner* — Maytee Marie Contes De Jesus
(74) *Attorney, Agent, or Firm* — Riverside Law LLP

(57) ABSTRACT

The present invention provides bioengineered extracellular matrix model derived from decellularized Wharton's jelly matrix (DWJM) and methods for making and using the same. After decellularization, the DWJM is homogenized, frozen, and lyophilized in a mold to form a molded scaffold having a substantially uniform pore size, pore distribution, and matrix component distribution, and can be trimmed and shaped to any desired size. The bioengineered DWJM is able to maintain the stem cell qualities of cultured cells, which is useful in screening chemotherapy drugs that target cancers, especially cancer stem cell populations. The bioengineered DWJM possesses matrix components similar to the bone hematopoietic niche and is useful in expanding and maintaining hematopoietic stem cells as well as promoting bone regeneration and repair.

13 Claims, 13 Drawing Sheets

Specification includes a Sequence Listing.

(56) References Cited

OTHER PUBLICATIONS

Franc S et al., "Microfibrillar composition of umbilical cord matrix: characterization of fibrillin, collagen VI and intact collagen V," Placenta, 1998, 19(1):95-104.

Jae-Won Shin et al, "Extracellular matrix stiffness causes systematic variations in proliferation and chemosensitivity in myeloid leukemias", PNAS, US, (Oct. 25, 2016), vol. 113, No. 43, doi:10.1073/pnas.1611338113, ISSN 0027-8424, pp. 12126-12131, XP055607799.

Li D., et al., "A Novel 3D Extracellular Matrix Model Enriching Human Acute Myeloid Leukemia Stem Cells," Blood (2015) 126 (23) : 4959.

Lo Celso C et al., "Live-animal tracking of individual haematopoietic stem/progenitor cells in their niche," Nature, 2009, 457(7225):92-6.

Sobolewski K et al., "Collagen and glycosaminoglycans of Wharton's jelly.," Biol Neonate, 1997, 71(1):11-21).

Tongguang Xiao et al, "Fabrication and In Vitro Study of Tissue-Engineered Cartilage Scaffold Derived from Wharton's Jelly Extracellular Matrix", Biomed Research International, (Jan. 1, 2017), vol. 2017, doi:10.1155/2017/5839071, ISSN 2314-6133, pp. 1-12, XP055607407.

\* cited by examiner

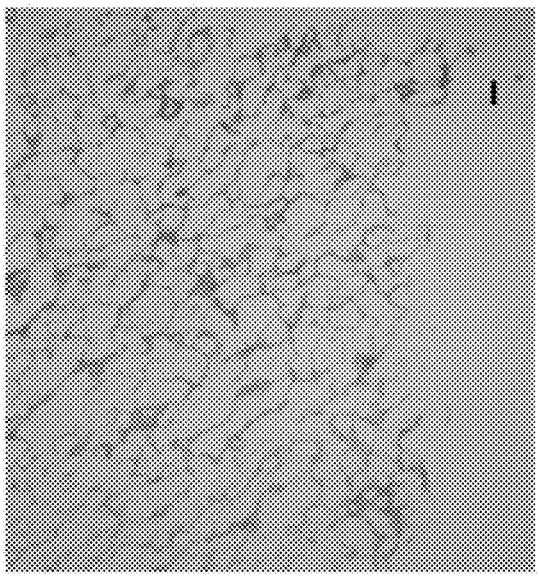
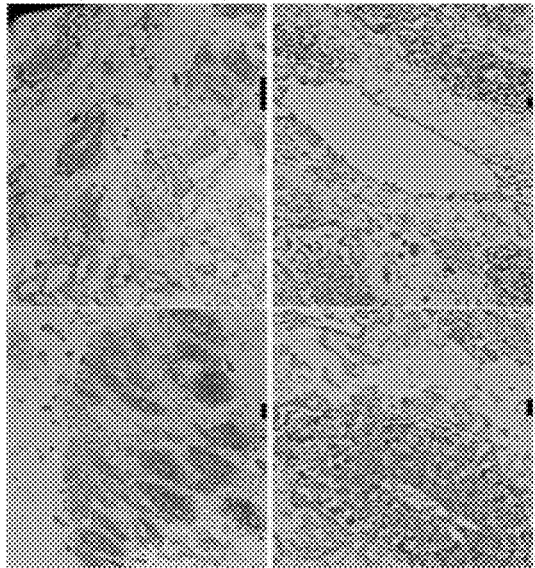
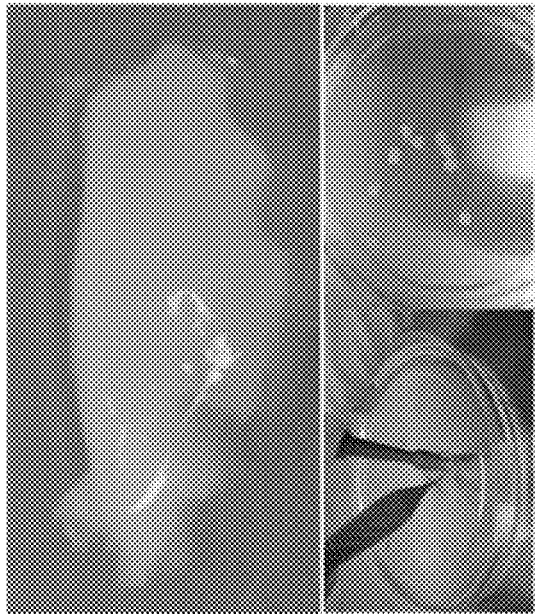
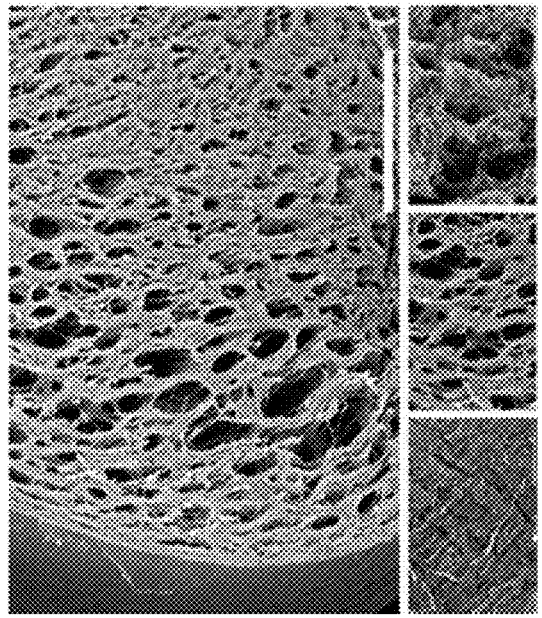

FIG. 3A
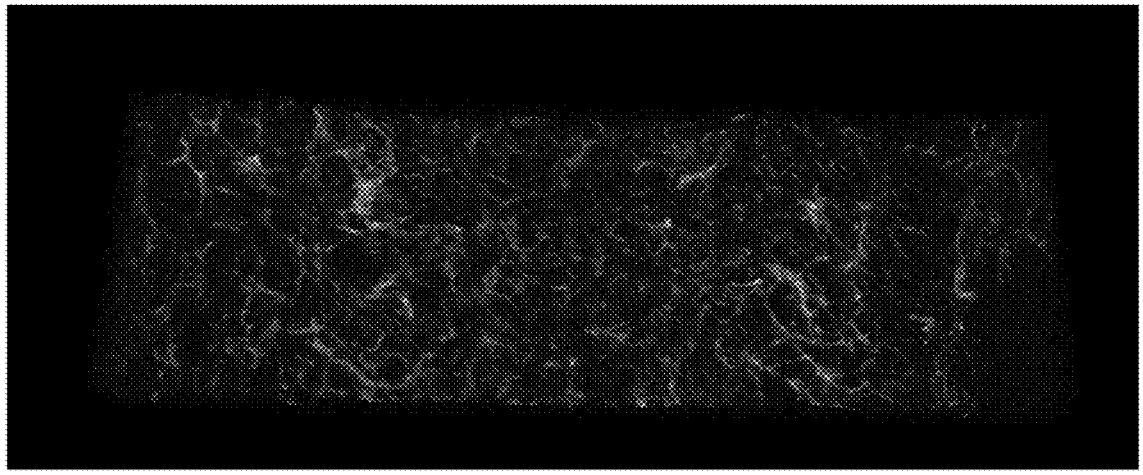
FIG. 3B
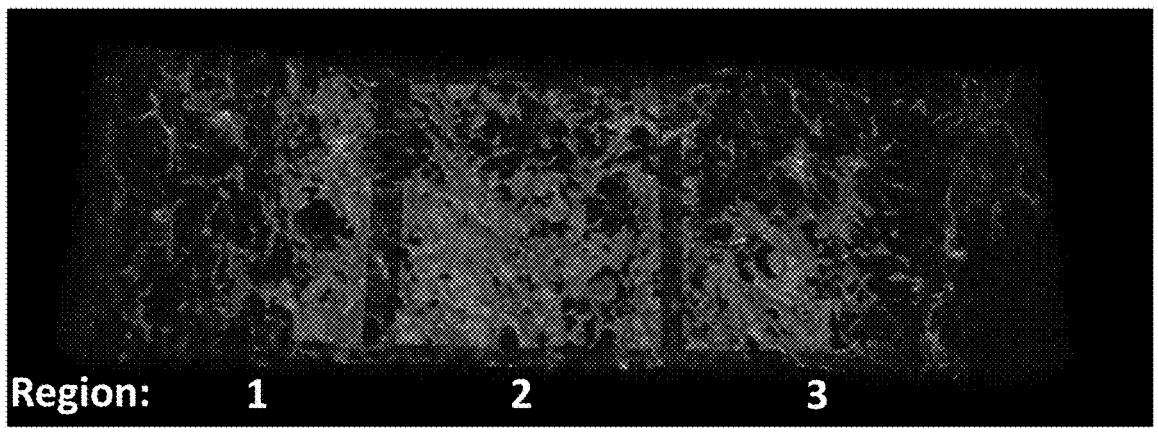
*Each region 20 slices thick
FIG. 3C
| Region # | Porosity | Pore Size (μm) |
| --- | --- | --- |
| Region 1 | 89% | 330.561206 |
| Region 2 | 84% | 235.621732 |
| Region 3 | 91% | 295.345196 |

| Description of proteins more abundant in DWJM | MW [kDa] | Abundance Ratio: DWJM / DWJM disk |
|---|---|---|
| Fibrinogen gamma chain OS=Homo sapiens GN=FGG PE=1 SV=3 | 51.5 | 31.963 |
| Myosin-10 OS=Homo sapiens GN=MYH10 PE=1 SV=3 | 228.9 | 13.136 |
| Myosin-9 OS=Homo sapiens GN=MYH9 PE=1 SV=4 | 226.4 | 10.246 |
| Filamin-A OS=Homo sapiens GN=FLNA PE=1 SV=4 | 280.6 | 9.78 |
| Palladin OS=Homo sapiens GN=PALLD PE=1 SV=3 | 150.5 | 8.903 |
| Fibrinogen beta chain OS=Homo sapiens GN=FGB PE=1 SV=2 | 55.9 | 8.291 |
| Alpha-actinin-4 OS=Homo sapiens GN=ACTN4 PE=1 SV=2 | 104.8 | 7.867 |
| Myosin-11 OS=Homo sapiens GN=MYH11 PE=1 SV=3 | 227.2 | 7.818 |
| Collagen alpha-6(VI) chain OS=Homo sapiens GN=COL6A6 PE=1 SV=2 | 247 | 7.399 |
| Dihydropyrimidinase-related protein 2 OS=Homo sapiens GN=DPYSL2 PE=1 SV=1 | 62.3 | 6.919 |
| Vinculin OS=Homo sapiens GN=VCL PE=1 SV=4 | 123.7 | 6.82 |
| Collagen alpha-1(XII) chain OS=Homo sapiens GN=COL12A1 PE=1 SV=2 | 332.9 | 6.413 |
| Alpha-actinin-1 OS=Homo sapiens GN=ACTN1 PE=1 SV=2 | 103 | 6.124 |
| Moesin OS=Homo sapiens GN=MSN PE=1 SV=3 | 67.8 | 6.113 |
| Dihydropyrimidinase-related protein 3 OS=Homo sapiens GN=DPYSL3 PE=1 SV=1 | 61.9 | 5.764 |
| Periostin OS=Homo sapiens GN=POSTN PE=1 SV=2 | 93.3 | 5.683 |
| Laminin subunit alpha-4 OS=Homo sapiens GN=LAMA4 PE=1 SV=4 | 202.4 | 5.674 |
| Annexin A6 OS=Homo sapiens GN=ANXA6 PE=1 SV=3 | 75.8 | 5.628 |
| LIM and SH3 domain protein 1 OS=Homo sapiens GN=LASP1 PE=1 SV=2 | 29.7 | 4.759 |
| Collagen alpha-1(XIV) chain OS=Homo sapiens GN=COL14A1 PE=1 SV=3 | 193.4 | 4.586 |
| Complement C3 OS=Homo sapiens GN=C3 PE=1 SV=2 | 187 | 4.482 |

FIG. 6A

| Description of proteins more abundant in DWJM | MW [kDa] | Abundance Ratio: DWJM / DWJM disk |
|---|---|---|
| Talin-1 OS=Homo sapiens GN=TLN1 PE=1 SV=3 | 269.6 | 4.461 |
| Coagulation factor XIII A chain OS=Homo sapiens GN=F13A1 PE=1 SV=4 | 83.2 | 4.432 |
| Fibrinogen alpha chain OS=Homo sapiens GN=FGA PE=1 SV=2 | 94.9 | 4.421 |
| Filamin-B OS=Homo sapiens GN=FLNB PE=1 SV=2 | 278 | 4.252 |
| Thioredoxin domain-containing protein 5 OS=Homo sapiens GN=TXNDC5 PE=1 SV=2 | 47.6 | 4.202 |
| Tenascin OS=Homo sapiens GN=TNC PE=1 SV=3 | 240.7 | 4.117 |
| Cytoskeleton-associated protein 4 OS=Homo sapiens GN=CKAP4 PE=1 SV=2 | 66 | 4.077 |
| Collagen alpha-3(VI) chain OS=Homo sapiens GN=COL6A3 PE=1 SV=5 | 343.5 | 4.023 |
| Caldesmon OS=Homo sapiens GN=CALD1 PE=1 SV=3 | 93.2 | 4.002 |
| Laminin subunit alpha-2 OS=Homo sapiens GN=LAMA2 PE=1 SV=4 | 343.7 | 3.964 |
| Dipeptidyl peptidase 4 OS=Homo sapiens GN=DPP4 PE=1 SV=2 | 88.2 | 3.9 |
| Alpha-2-macroglobulin OS=Homo sapiens GN=A2M PE=1 SV=3 | 163.2 | 3.894 |
| Elongation factor 1-alpha 1 OS=Homo sapiens GN=EEF1A1 PE=1 SV=1 | 50.1 | 3.886 |
| Spondin-1 OS=Homo sapiens GN=SPON1 PE=1 SV=2 | 90.9 | 3.841 |
| Clathrin heavy chain 1 OS=Homo sapiens GN=CLTC PE=1 SV=5 | 191.5 | 3.815 |
| Complement factor H OS=Homo sapiens GN=CFH PE=1 SV=4 | 139 | 3.759 |
| von Willebrand factor OS=Homo sapiens GN=VWF PE=1 SV=4 | 309.1 | 3.648 |
| Vitamin D-binding protein OS=Homo sapiens GN=GC PE=1 SV=1 | 52.9 | 3.557 |
| Plectin OS=Homo sapiens GN=PLEC PE=1 SV=3 | 531.5 | 3.487 |
| Annexin A1 OS=Homo sapiens GN=ANXA1 PE=1 SV=2 | 38.7 | 3.446 |
| Alpha-fetoprotein OS=Homo sapiens GN=AFP PE=1 SV=1 | 68.6 | 3.436 |
| Transgelin OS=Homo sapiens GN=TAGLN PE=1 SV=4 | 22.6 | 3.435 |
| Serpin H1 OS=Homo sapiens GN=SERPINH1 PE=1 SV=2 | 46.4 | 3.31 |

FIG. 6B

| Description of proteins more abundant in DWJM | MW (kDa) | Abundance Ratio: DWJM / DWJM disk |
|---|---|---|
| Protein-glutamine gamma-glutamyltransferase 2 OS=Homo sapiens GN=TGM2 PE=1 SV=2 | 77.3 | 3.307 |
| Heat shock-related 70 kDa protein 2 OS=Homo sapiens GN=HSPA2 PE=1 SV=1 | 70 | 3.209 |
| Laminin subunit gamma-1 OS=Homo sapiens GN=LAMC1 PE=1 SV=3 | 177.5 | 3.208 |
| Fibronectin OS=Homo sapiens GN=FN1 PE=1 SV=4 | 262.5 | 3.208 |
| Laminin subunit beta-1 OS=Homo sapiens GN=LAMB1 PE=1 SV=2 | 197.9 | 3.037 |
| Gelsolin OS=Homo sapiens GN=GSN PE=1 SV=1 | 85.6 | 2.997 |
| Septin-2 OS=Homo sapiens GN=SEPT2 PE=1 SV=1 | 41.5 | 2.988 |
| Pyruvate kinase PKM OS=Homo sapiens GN=PKM PE=1 SV=4 | 57.9 | 2.951 |
| Membrane primary amine oxidase OS=Homo sapiens GN=AOC3 PE=1 SV=3 | 84.6 | 2.86 |
| Ig gamma-3 chain C region OS=Homo sapiens GN=IGHG3 PE=1 SV=2 | 41.3 | 2.82 |
| Laminin subunit alpha-5 OS=Homo sapiens GN=LAMA5 PE=1 SV=8 | 399.5 | 2.808 |
| Myeloid-associated differentiation marker OS=Homo sapiens GN=MYADM PE=1 SV=2 | 35.3 | 2.777 |
| Calponin-1 OS=Homo sapiens GN=CNN1 PE=1 SV=2 | 33.2 | 2.705 |
| Phosphoglycerate kinase 1 OS=Homo sapiens GN=PGK1 PE=1 SV=3 | 44.6 | 2.649 |
| Matrilin-2 OS=Homo sapiens GN=MATN2 PE=1 SV=4 | 106.8 | 2.645 |
| Tenascin-X OS=Homo sapiens GN=TNXB PE=1 SV=4 | 457.9 | 2.602 |
| Sulfhydryl oxidase 1 OS=Homo sapiens GN=QSOX1 PE=1 SV=3 | 82.5 | 2.491 |
| Alpha-1-antitrypsin OS=Homo sapiens GN=SERPINA1 PE=1 SV=3 | 46.7 | 2.439 |
| Laminin subunit beta-2 OS=Homo sapiens GN=LAMB2 PE=1 SV=2 | 195.9 | 2.417 |
| Collagen alpha-2(VI) chain OS=Homo sapiens GN=COL6A2 PE=1 SV=4 | 108.5 | 2.414 |
| Plasma protease C1 inhibitor OS=Homo sapiens GN=SERPING1 PE=1 SV=2 | 55.1 | 2.368 |
| Caveolin-1 OS=Homo sapiens GN=CAV1 PE=1 SV=4 | 20.5 | 2.361 |
| Asporin OS=Homo sapiens GN=ASPN PE=1 SV=2 | 43.4 | 2.315 |

FIG. 6C

| Description of proteins more abundant in DWJM | MW [kDa] | Abundance Ratio: DWJM / DWJM disk |
|---|---|---|
| Serotransferrin OS=Homo sapiens GN=TF PE=1 SV=3 | 77 | 2.252 |
| WD repeat-containing protein 1 OS=Homo sapiens GN=WDR1 PE=1 SV=4 | 66.2 | 2.243 |
| Collagen alpha-1(VI) chain OS=Homo sapiens GN=COL6A1 PE=1 SV=3 | 108.5 | 2.236 |
| Ig gamma-1 chain C region OS=Homo sapiens GN=IGHG1 PE=1 SV=1 | 36.1 | 2.22 |
| Keratin, type II cytoskeletal 6A OS=Homo sapiens GN=KRT6A PE=1 SV=3 | 60 | 2.193 |
| Target of Nesh-SH3 OS=Homo sapiens GN=ABI3BP PE=1 SV=1 | 118.6 | 2.166 |
| Peroxidasin homolog OS=Homo sapiens GN=PXDN PE=1 SV=2 | 165.2 | 2.14 |
| Ig gamma-2 chain C region OS=Homo sapiens GN=IGHG2 PE=1 SV=2 | 35.9 | 2.14 |
| Ig heavy chain V-III region 23 OS=Homo sapiens GN=IGHV3-23 PE=1 SV=2 | 12.6 | 2.139 |
| Alpha-enolase OS=Homo sapiens GN=ENO1 PE=1 SV=2 | 47.1 | 2.114 |
| Collagen alpha-1(I) chain OS=Homo sapiens GN=COL1A1 PE=1 SV=5 | 138.9 | 1.994 |
| Prelamin-A/C OS=Homo sapiens GN=LMNA PE=1 SV=1 | 74.1 | 1.904 |

FIG. 6D

| Description of proteins less abundant in DWIM | MW [kDa] | Abundance Ratio: DWIM / DWIM disk |
|---|---|---|
| Clusterin OS=Homo sapiens GN=CLU PE=1 SV=1 | 52.5 | 0.503 |
| Nidogen-2 OS=Homo sapiens GN=NID2 PE=1 SV=3 | 151.2 | 0.497 |
| Tubulointerstitial nephritis antigen-like OS=Homo sapiens GN=TINAGL1 PE=1 SV=1 | 52.4 | 0.496 |
| Protein-lysine 6-oxidase OS=Homo sapiens GN=LOX PE=1 SV=2 | 46.9 | 0.49 |
| Complement C1q tumor necrosis factor-related protein 3 OS=Homo sapiens GN=C1QTNF3 PE=1 SV=1 | 27 | 0.473 |
| Peroxiredoxin-1 OS=Homo sapiens GN=PRDX1 PE=1 SV=1 | 22.1 | 0.468 |
| Pentraxin-related protein PTX3 OS=Homo sapiens GN=PTX3 PE=1 SV=3 | 41.9 | 0.465 |
| Sushi repeat-containing protein SRPX2 OS=Homo sapiens GN=SRPX2 PE=1 SV=1 | 52.9 | 0.455 |
| Versican core protein OS=Homo sapiens GN=VCAN PE=1 SV=3 | 372.6 | 0.449 |
| Left-right determination factor 2 OS=Homo sapiens GN=LEFTY2 PE=1 SV=2 | 40.9 | 0.438 |
| Keratin, type II cytoskeletal 2 epidermal OS=Homo sapiens GN=KRT2 PE=1 SV=2 | 65.4 | 0.424 |
| C-type lectin domain family 11 member A OS=Homo sapiens GN=CLEC11A PE=1 SV=1 | 35.7 | 0.418 |
| Cartilage acidic protein 1 OS=Homo sapiens GN=CRTAC1 PE=1 SV=2 | 71.4 | 0.402 |
| Desmoplakin OS=Homo sapiens GN=DSP PE=1 SV=3 | 331.6 | 0.394 |
| Keratin, type I cytoskeletal 10 OS=Homo sapiens GN=KRT10 PE=1 SV=6 | 58.8 | 0.387 |
| Fibulin-5 OS=Homo sapiens GN=FBLN5 PE=1 SV=1 | 50.1 | 0.386 |
| Lysyl oxidase homolog 1 OS=Homo sapiens GN=LOXL1 PE=1 SV=2 | 63.1 | 0.379 |
| EGF-containing fibulin-like extracellular matrix protein 2 OS=Homo sapiens GN=EFEMP2 PE=1 SV=3 | 49.4 | 0.379 |
| Histone H3.1 OS=Homo sapiens GN=HIST1H3A PE=1 SV=2 | 15.4 | 0.365 |
| Latent-transforming growth factor beta-binding protein 4 OS=Homo sapiens GN=LTBP4 PE=1 SV=2 | 173.3 | 0.343 |
| Microfibrillar-associated protein 2 OS=Homo sapiens GN=MFAP2 PE=2 SV=1 | 20.8 | 0.342 |
| Microfibril-associated glycoprotein 4 OS=Homo sapiens GN=MFAP4 PE=1 SV=2 | 28.6 | 0.335 |

FIG. 7A

| Description of proteins less abundant in DWJM | MW [kDa] | Abundance Ratio: DWJM / DWJM disk |
|---|---|---|
| Complement C1q subcomponent subunit C OS=Homo sapiens GN=C1QC PE=1 SV=3 | 25.8 | 0.299 |
| 14-3-3 protein sigma OS=Homo sapiens GN=SFN PE=1 SV=1 | 27.8 | 0.289 |
| Galectin-1 OS=Homo sapiens GN=LGALS1 PE=1 SV=2 | 14.7 | 0.285 |
| Keratin, type II cytoskeletal 1b OS=Homo sapiens GN=KRT77 PE=2 SV=3 | 61.9 | 0.283 |
| Hemoglobin subunit beta OS=Homo sapiens GN=HBB PE=1 SV=2 | 16 | 0.283 |
| Apolipoprotein A-I OS=Homo sapiens GN=APOA1 PE=1 SV=1 | 30.8 | 0.277 |
| Filaggrin-2 OS=Homo sapiens GN=FLG2 PE=1 SV=1 | 247.9 | 0.276 |
| Alpha-1-acid glycoprotein 1 OS=Homo sapiens GN=ORM1 PE=1 SV=1 | 23.5 | 0.273 |
| Keratin, type II cytoskeletal 1 OS=Homo sapiens GN=KRT1 PE=1 SV=6 | 66 | 0.273 |
| Keratinocyte proline-rich protein OS=Homo sapiens GN=KPRP PE=1 SV=1 | 64.1 | 0.259 |
| Collagen triple helix repeat-containing protein 1 OS=Homo sapiens GN=CTHRC1 PE=1 SV=1 | 26.2 | 0.251 |
| Aggrecan core protein OS=Homo sapiens GN=ACAN PE=1 SV=2 | 250 | 0.238 |
| Keratin, type I cytoskeletal 9 OS=Homo sapiens GN=KRT9 PE=1 SV=3 | 62 | 0.199 |
| Splicing factor U2AF 65 kDa subunit OS=Homo sapiens GN=U2AF2 PE=1 SV=4 | 53.5 | 0.194 |
| Hemoglobin subunit alpha OS=Homo sapiens GN=HBA1 PE=1 SV=2 | 15.2 | 0.192 |
| Dermatopontin OS=Homo sapiens GN=DPT PE=1 SV=2 | 24 | 0.18 |
| Zinc-alpha-2-glycoprotein OS=Homo sapiens GN=AZGP1 PE=1 SV=2 | 34.2 | 0.151 |
| Lysozyme C OS=Homo sapiens GN=LYZ PE=1 SV=1 | 16.5 | 0.144 |
| Histone H2B type 1-K OS=Homo sapiens GN=HIST1H2BK PE=1 SV=3 | 13.9 | 0.137 |
| Tropomyosin beta chain OS=Homo sapiens GN=TPM2 PE=1 SV=1 | 32.8 | 0.132 |
| Hornerin OS=Homo sapiens GN=HRNR PE=1 SV=2 | 282.2 | 0.128 |
| Transthyretin OS=Homo sapiens GN=TTR PE=1 SV=1 | 15.9 | 0.075 |

FIG. 7B

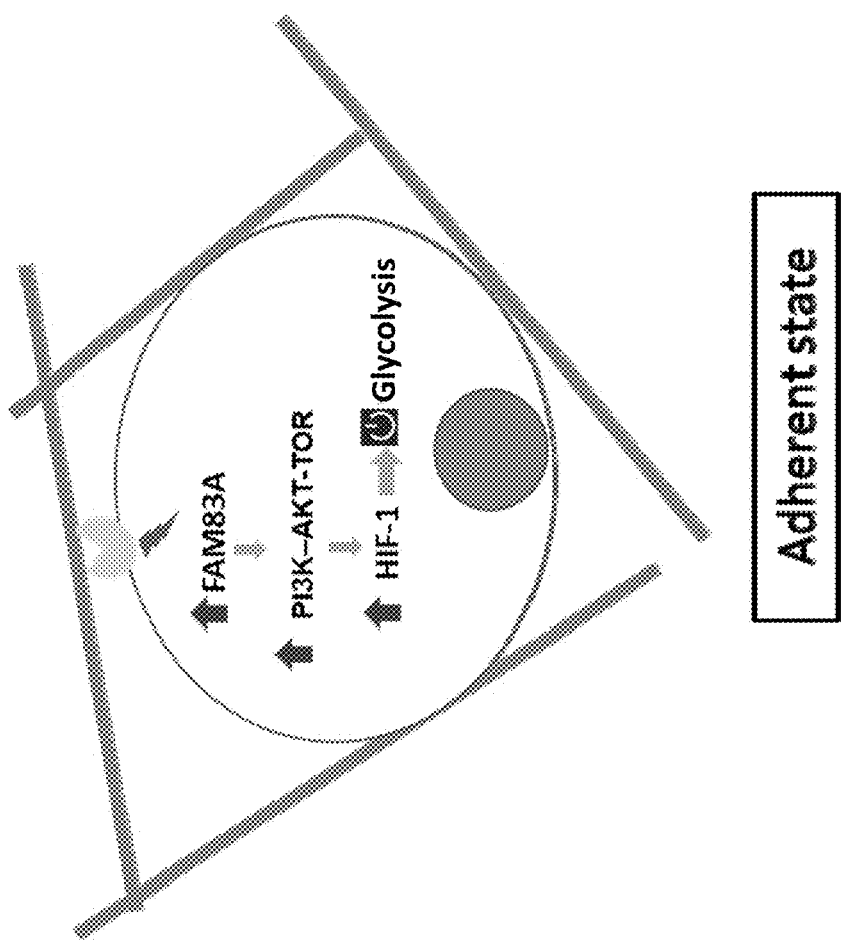
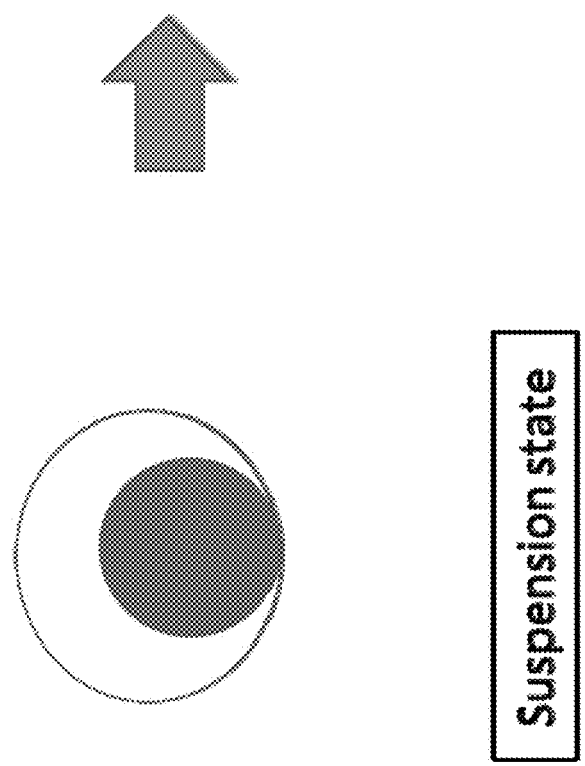
FIG. 9

SEQUENCE LISTING

```
<160> NUMBER OF SEQ ID NOS: 2

<210> SEQ ID NO 1
<211> LENGTH: 5
<212> TYPE: PRT
<213> ORGANISM: Artificial Sequence
<220> FEATURE:
<223> OTHER INFORMATION: Chemically Synthesized

<400> SEQUENCE: 1

Gly Arg Gly Asp Ser
1               5

<210> SEQ ID NO 2
<211> LENGTH: 3
<212> TYPE: PRT
<213> ORGANISM: Artificial Sequence
<220> FEATURE:
<223> OTHER INFORMATION: Chemically Synthesized

<400> SEQUENCE: 2

Arg Gly Asp
1
```

BIOENGINEERED WHARTON'S JELLY DERIVED EXTRACELLULAR MATRIX

CROSS-REFERENCE TO RELATED APPLICATIONS

This application is a U.S. national phase application filed under 35 U.S.C. § 371 claiming benefit to International Patent Application No. PCT/US2019/024768, filed Mar. 29, 2019, which is entitled to priority under 35 U.S.C. § 119(e) to U.S. Provisional Patent Application No. 62/650,551, filed Mar. 30, 2018, each of which application is hereby incorporated herein by reference in its entirety.

BACKGROUND OF THE INVENTION

Wharton's jelly is a mucoid, porous connective tissue around the umbilical cord vessels. Wharton's jelly contains a number of proteins, glycosaminoglycans, and growth factors that make it a suitable natural scaffold material. Decellularized, Wharton's jelly produces a porous, biodegradable, and biocompatible scaffold devoid of cells and retains its extracellular matrix proteins. However, as the source of decellularized Wharton's jelly matrix (DWJM) is the umbilical cord, the size, thickness, composition, and protein distribution of the DWJM varies widely between each cord, and even between different regions of each cord, making it difficult to use in a consistent manner.

There is a need in the art for improved decellularized Wharton's jelly matrix constructs. The present invention meets this need.

SUMMARY OF THE INVENTION

In one aspect, the present invention provides a porous matrix comprising molded decellularized Wharton's jelly matrix (DWJM) having a median pore size ranging from about 200 µm to about 350 µm.

In one embodiment, the median pore size ranges from about 230 µm to about 330 µm. In one embodiment, the median pore size is about 235 µm, about 275 µm, about 290 µm, about 300 µm, about 310 µm, about 320 µm, or about 330 µm. In one embodiment, a pore size distribution is no more than 50% or 17% of the median pore size. In one embodiment, the matrix has a volumetric porosity of between about 80% and 95%.

In one embodiment, the matrix further comprises a homogenous distribution of a matrix component selected from the group consisting of: collagen, fibronectin, tenascin C (TN-C), fibrillin, lumican, hyaluronic acid (HA), versican, fibrinogen gamma chain, myosin-9, myosin-10, paladin, filamin, vinculin, moesin, periostin, laminin, talin-1, and combinations thereof.

In one embodiment, the matrix has a fibrinogen gamma chain abundance ratio of between about 30 and 35. In one embodiment, the matrix has a myosin-9 abundance ratio of between about 10 and 15. In one embodiment, the matrix has a myosin-10 abundance ratio of between about 10 and 15.

In one embodiment, the matrix is molded or trimmed to a disc shape sized to fit in a cell culture well. In one embodiment, the matrix further comprises at least one population of seeded cells. In one embodiment, the matrix further comprises at least one therapeutic agent.

In another aspect, the present invention provides a method of making a bioengineered matrix, comprising the steps of: immersing decellularized Wharton's jelly matrix (DWJM) in liquid media; performing one or more homogenization cycles on the immersed DWJM to form homogenized DWJM, each homogenization cycle comprising a homogenizing period and a resting period; shaping the homogenized DWJM; freezing the homogenized DWJM; and lyophilizing the frozen DWJM under vacuum to form a bioengineered matrix.

In one embodiment, the liquid media is distilled water. In one embodiment, the one or more homogenization cycles are performed on immersed DWJM kept on ice. In one embodiment, each homogenization cycle comprises a homogenizing period of about 30 seconds and a resting period of about 120 seconds. In one embodiment, each homogenizing period comprises the activation of a disperser mixer in the immersed DWJM. In one embodiment, at least 30 homogenization cycles are performed. In one embodiment, the homogenized DWJM is shaped using 3D printing. In one embodiment, the homogenized DWJM is shaped using a mold. In one embodiment, the freezing step is performed between about −80° C. and −180° C. In one embodiment, the lyophilizing step is performed between about −20° C. and −60° C. at about 0.05 mBar.

In another aspect, the present invention provides a method of promoting bone regeneration in a subject, comprising the steps of: providing the porous matrix of the present invention; loading the matrix with one or more osteogenic and angiogenic growth factors; and implanting the porous matrix in a bone defect of the subject.

In another aspect, the present invention provides a method of culturing hematopoietic stem cells, comprising the steps of seeding CD34+ cells onto the porous matrix of the present invention, wherein the cells maintain quiescence while cultured on the porous matrix. In one embodiment, the seeded CD34+ cells have megakaryocyte lineage bias.

In another aspect, the present invention provides a cancer model, comprising the porous matrix of the present invention and a population of cancer cells embedded in the porous matrix. In one embodiment, the population of cancer cells exhibit cancer stem cells characteristics. In one embodiment, the population of cancer cells is selected from the group consisting of: leukemia, lymphoma, myeloma, breast cancer, prostate cancer, endometrial cancer, bladder cancer, brain cancer, cervical cancer, lung cancer, melanoma, cervical cancer, ovarian cancer, colorectal cancer, pancreatic cancer, esophageal cancer, kidney cancer, thyroid cancer, liver cancer, uterine cancer, soft tissue sarcoma, bone cancer, and stomach cancer.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities of the embodiments shown in the drawings.

FIG. 1A through FIG. 1D depict the characterization of decellularized Wharton's jelly matrix (DWJM), as previously published. (FIG. 1A) A representative piece of DWJM. (FIG. 1B) H&E stain of a section of DWJM. (FIG. 1C) SEM image of DWJM. (FIG. 1D) TEM image of DWJM.

(FIG. 2A) Bioengineered DWJM sheets after lyophilization. (FIG. 2B) SEM images of bioengineered DWJM disks after lyophilization (left). Notice the pore size in the middle panel (31-79 µm) and primary leukemia patient cell attachment to DWJM fibers (right).

FIG. 3A through FIG. 3C depict the results of characterizing bioengineered DWJM. (FIG. 3A) An SEM image of a section of bioengineered DWJM. (FIG. 3B) The section of bioengineered DWJM split into three regions for characterization. (FIG. 3C) The results of characterizing the porosity and pore size of each region, demonstrating its substantial uniformity.

FIG. 6A through FIG. 6D is a chart showing the abundance ratio of more abundant matrix components between a section of DWJM and a comparably sized section of an exemplary bioengineered DWJM as determined by mass spectrometry.

FIG. 7A through FIG. 7B is a chart showing the abundance ratio of less abundant matrix components between a section of DWJM and a comparably sized section of an exemplary bioengineered DWJM as determined by mass spectrometry.

FIG. 9 is a diagram showing a primary leukemia cell in a suspension state (left) and a leukemia cell in an adherent state in DWJM (right). Predicted cellular signals that trigger glycolysis are shown in the adherent state.

DETAILED DESCRIPTION

Figure 2A:
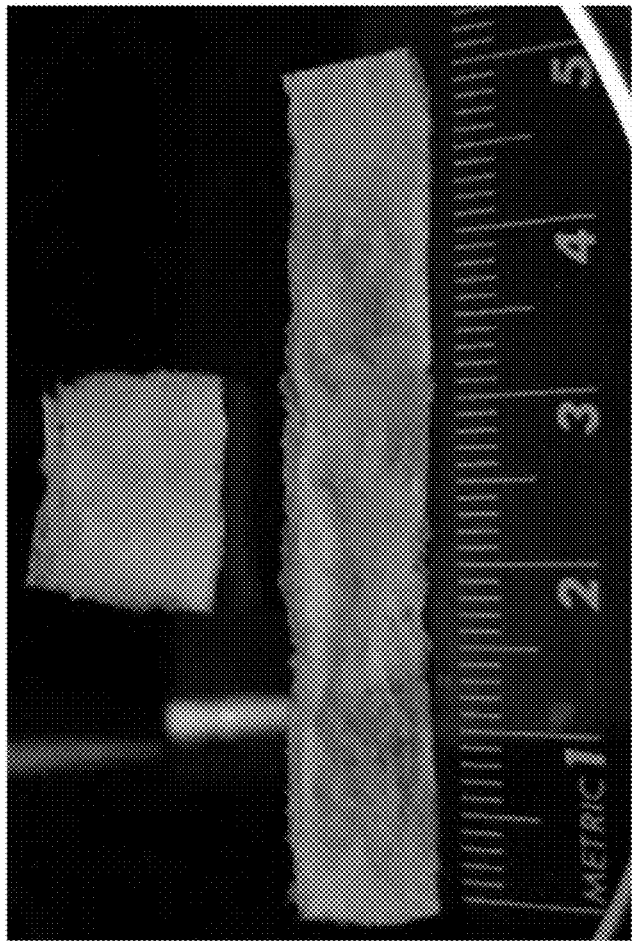
FIG. 2A and FIG. 2B depict bioengineered DWJM.

The present invention provides bioengineered extracellular matrix model derived from decellularized Wharton's jelly matrix (DWJM) and methods for making and using the same. After decellularization, the DWJM is homogenized, frozen, and lyophilized in a mold to form a molded scaffold having a substantially uniform pore size, pore distribution, and matrix component distribution, and can be trimmed and shaped to any desired size. The bioengineered DWJM maintains the stem cell qualities of cultured cells, which is useful in screening chemotherapy drugs that target cancers, especially cancer stem cell populations. The bioengineered DWJM possesses matrix components similar to the bone hematopoietic niche and is useful in expanding and maintaining hematopoietic stem cells as well as promoting bone regeneration and repair.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

The terms "cells" and "population of cells" are used interchangeably and refer to a plurality of cells, i.e., more than one cell. The population may be a pure population comprising one cell type. Alternatively, the population may comprise more than one cell type. In the present invention, there is no limit on the number of cell types that a cell population may comprise.

"Differentiated" is used herein to refer to a cell that has achieved a terminal state of maturation such that the cell has developed fully and demonstrates biological specialization and/or adaptation to a specific environment and/or function. Typically, a differentiated cell is characterized by expression of genes that encode differentiation associated proteins in that cell. When a cell is said to be "differentiating," as that term is used herein, the cell is in the process of being differentiated.

"Differentiation medium" is used herein to refer to a cell growth medium comprising an additive or a lack of an additive such that a stem cell, tissue derived adult stromal cell or other such progenitor cell, that is not fully differentiated when incubated in the medium, develops into a cell with some or all of the characteristics of a differentiated cell.

The term "derived from" is used herein to mean to originate from a specified source.

"Expandability" is used herein to refer to the capacity of a cell to proliferate, for example, to expand in number or in the case of a cell population to undergo population doublings.

An "effective amount" or "therapeutically effective amount" of a compound is that amount of compound which is sufficient to provide a beneficial effect to the subject to which the compound is administered. An "effective amount" of a delivery vehicle is that amount sufficient to effectively bind or deliver a compound.

"Extracellular matrix" or "matrix" refers to one or more substances that provide substantially the same conditions for supporting cell growth as provided by an extracellular matrix synthesized by feeder cells. The matrix may be provided on a substrate. Alternatively, the component(s) comprising the matrix may be provided in solution.

As used herein "growth factors" is intended the following non-limiting factors including, but not limited to, growth hormone, erythropoietin, thrombopoietin, interleukin 3, interleukin 6, interleukin 7, macrophage colony stimulating factor, c-kit ligand/stem cell factor, osteoprotegerin ligand, insulin, insulin like growth factors, epidermal growth factor (EGF), fibroblast growth factor (FGF), nerve growth factor, ciliary neurotrophic factor, platelet derived growth factor (PDGF), transforming growth factor (TGF-beta), hepatocyte growth factor (HGF), and bone morphogenetic protein at concentrations of between picogram/ml to milligram/ml levels.

As used herein, the term "growth medium" is meant to refer to a culture medium that promotes growth of cells. A growth medium will generally contain animal serum. In some instances, the growth medium may not contain animal serum.

An "isolated cell" refers to a cell which has been separated from other components and/or cells which naturally accompany the isolated cell in a tissue or mammal.

As used herein, the term "multipotential" or "multipotentiality" is meant to refer to the capability of a stem cell to differentiate into more than one type of cell.

As used herein, a "pluripotent cell" defines a less differentiated cell that can give rise to at least two distinct (genotypically and/or phenotypically) further differentiated progeny cells.

The terms "precursor cell," "progenitor cell," and "stem cell" are used interchangeably in the art and herein and refer either to a pluripotent, or lineage-uncommitted, progenitor cell, which is potentially capable of an unlimited number of mitotic divisions to either renew itself or to produce progeny cells which will differentiate into the desired cell type. Unlike pluripotent stem cells, lineage-committed progenitor cells are generally considered to be incapable of giving rise to numerous cell types that phenotypically differ from each other. Instead, progenitor cells give rise to one or possibly two lineage-committed cell types.

"Proliferation" is used herein to refer to the reproduction or multiplication of similar forms, especially of cells. That is, proliferation encompasses production of a greater number of cells, and can be measured by, among other things, simply counting the numbers of cells, measuring incorporation of $^3$H-thymidine into the cell, and the like.

"Progression of or through the cell cycle" is used herein to refer to the process by which a cell prepares for and/or enters mitosis and/or meiosis. Progression through the cell cycle includes progression through the G1 phase, the S phase, the G2 phase, and the M-phase.

The terms "patient," "subject," "individual," and the like are used interchangeably herein, and refer to any animal, or cells thereof whether in vitro or in situ, amenable to the methods described herein. In certain non-limiting embodiments, the patient, subject or individual is a human.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Bioengineered Decellularized Wharton's Jelly Matrix

The present invention relates to bioengineered decellularized Wharton's jelly matrix (DWJM). The bioengineered DWJM retains the 3D structure and extracellular matrix composition of DWJM with the enhancements of substantial uniformity in pore size, pore distribution, and matrix component distribution.

Wharton's jelly is the gelatinous connective tissue of the umbilical cord that mainly supports blood vessels in the umbilical cord (FIG. 1A through FIG. 1D). It includes an abundance of extracellular matrix components, such as collagen, fibronectin, hyaluronic acid, and sulfated proteoglycan, as well as a number of growth factors, including insulin-like growth factor 1 (IGF-1), fibroblast growth factor (FGF), transforming growth factor beta 1 (TGF-β1), epidermal growth factor (EGF), and platelet-derived growth factor (PDGF).

Figure 2B:
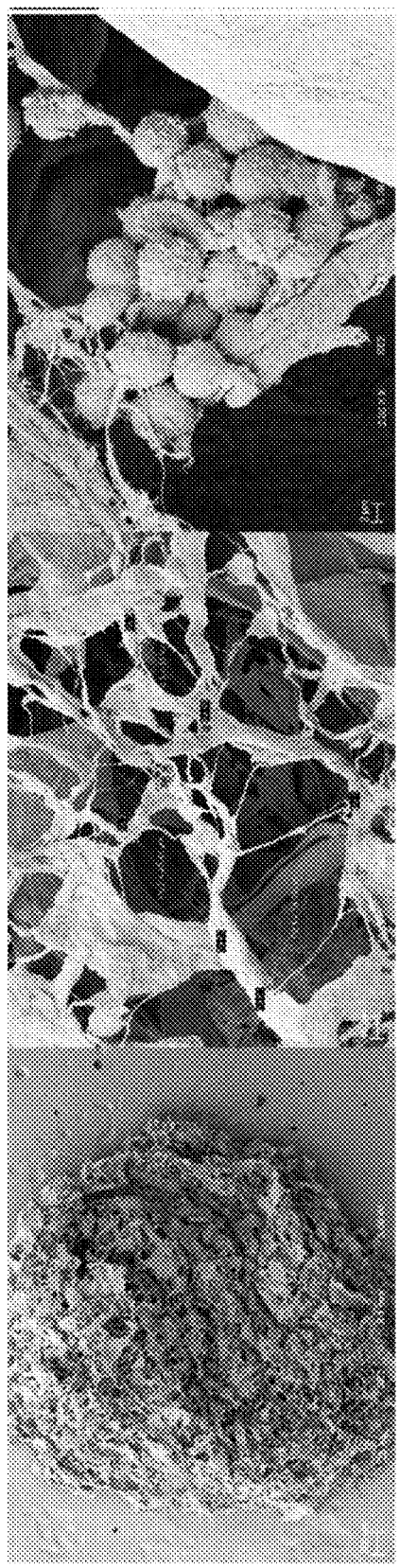
Figure 4:
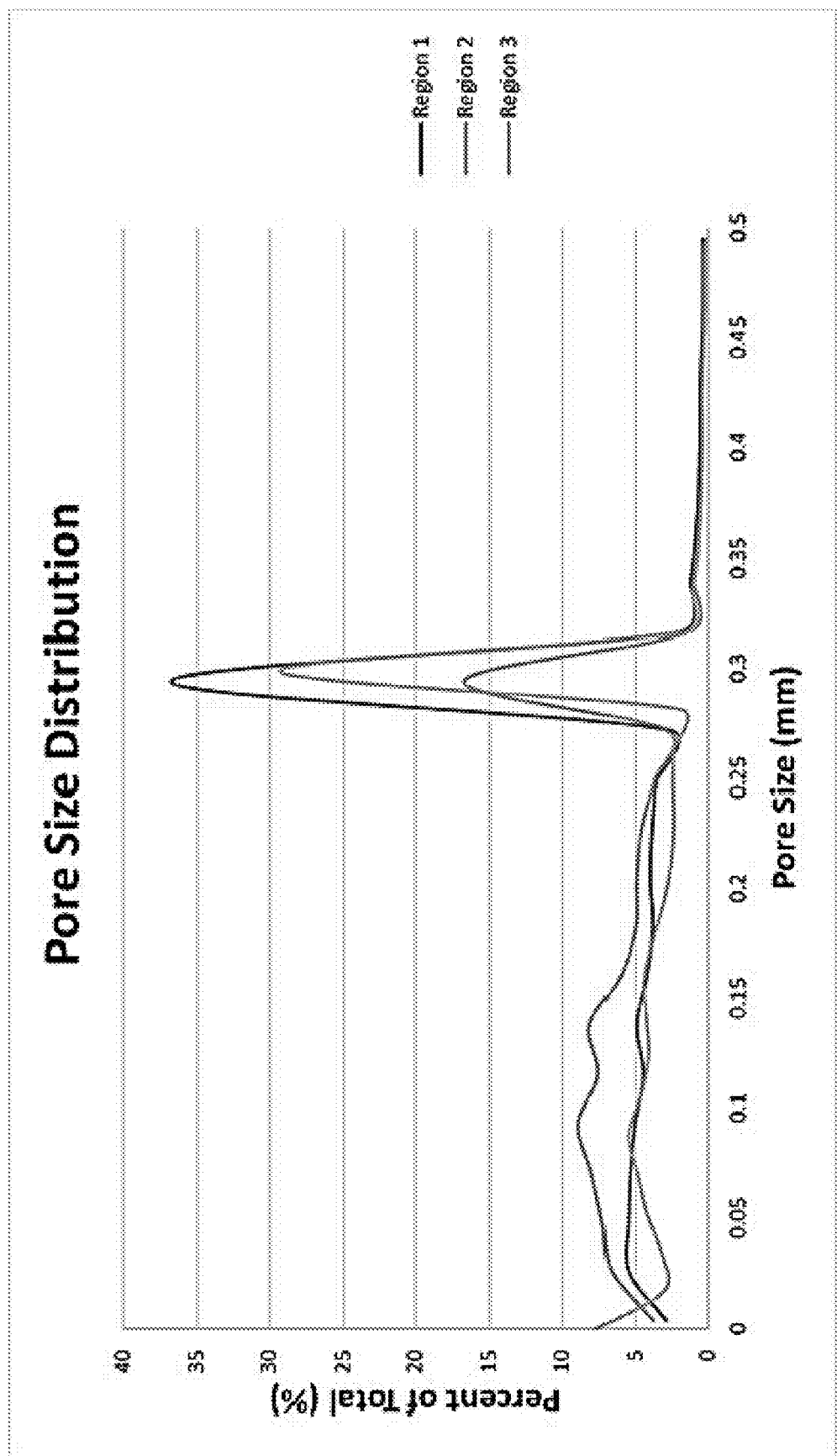
FIG. 4 is a graph showing the results of characterizing the pore size distribution in each region of the section of bioengineered DWJM shown in FIG. 3B.
Figure 5:
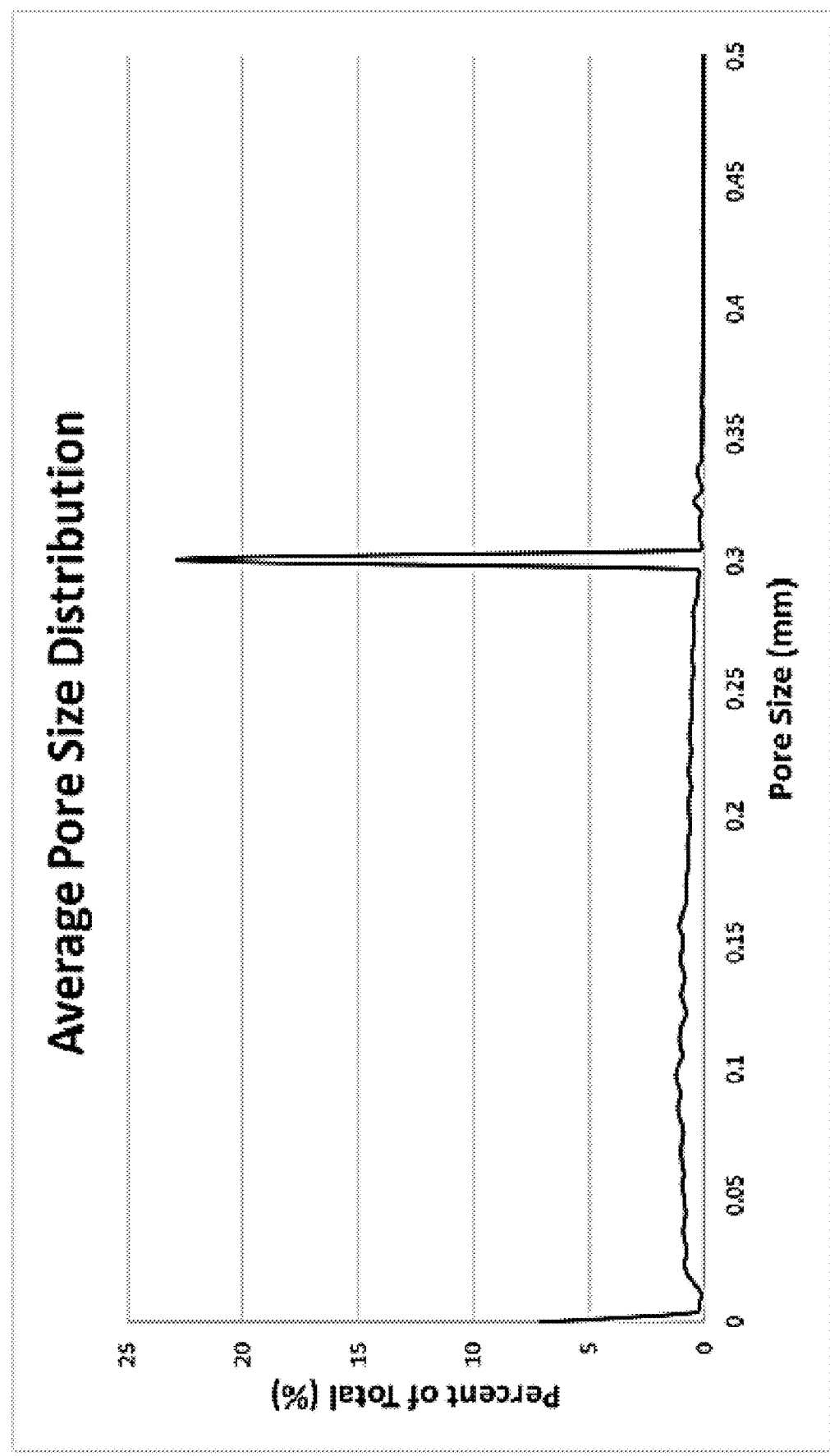
FIG. 5 is a graph showing the average pore size distribution across all three regions in the section of bioengineered DWJM shown in FIG. 3B.

The bioengineered DWJM of the present invention comprises Wharton's jelly that has been separated from the umbilical cord, decellularized, homogenized, and lyophilized within a mold to form the substantially uniform 3D matrix structure. The bioengineered DWJM can have any suitable size or shape that can be determined by the size and shape of the mold used, or by trimming an existing bioengineered DWJM. For example, bioengineered DWJM can be formed initially as a sheet and trimmed or cut into smaller pieces (FIG. 2A) or shaped into disks (FIG. 2B), such as with a biopsy punch. Bioengineered DWJM having a disk shape can be sized to fit within the wells of a multi-well plate, such as a 96-well plate, and be capable of supporting high-throughput screens and other studies.

The bioengineered DWJM can have any suitable pore size. For example, the diameter of the pore size can range between about 10 μm to 1000 μm. In some embodiments, the bioengineered DWJM has a median pore size between about 200 μm and 350 μm. In some embodiments, the median pore size is between about 230 μm and 330 μm. In some embodiments, the median pore size is about 235 μm, about 275 μm, about 290 μm, about 300 μm, about 310 μm, about 320 μm, or about 330 μm. The uniformity of the pore size distribution can be described as a deviation within a percent of the median pore size. In various embodiments, the pore size distribution deviates no more than 50% of the median pore size. In some embodiments, the pore size distribution deviates no more than 17% of the median pore size.

The bioengineered DWJM can have any suitable volumetric porosity. Volumetric porosity is defined as the measure of the void space in a material. For example, two distinct bioengineered DWJM can have the same volumetric size and the same pore size ranges but have different volumetric porosity, wherein the bioengineered DWJM having greater volumetric porosity has a greater number of pores with less matrix material between each pore, and the bioengineered DWJM having lesser volumetric porosity comprises a fewer number of pores with more matrix material between each pore. In various embodiments, the bioengineered DWJM can have a volumetric porosity of between about 80% and 95%.

As described above, Wharton's jelly is harvested from umbilical cords and therefore varies in its composition between each umbilical cord, and even between different regions of each umbilical cord. The bioengineered DWJM comprises a homogenous distribution of matrix components, including but not limited to: collagen, fibronectin, tenascin C (TN-C), fibrillin, lumican, hyaluronic acid (HA), versican, fibrinogen gamma chain, myosin-9, myosin-10, paladin, filamin, vinculin, moesin, periostin, laminin, and talin-1.

Method of Making Bioengineered DWJM

Figure 8:
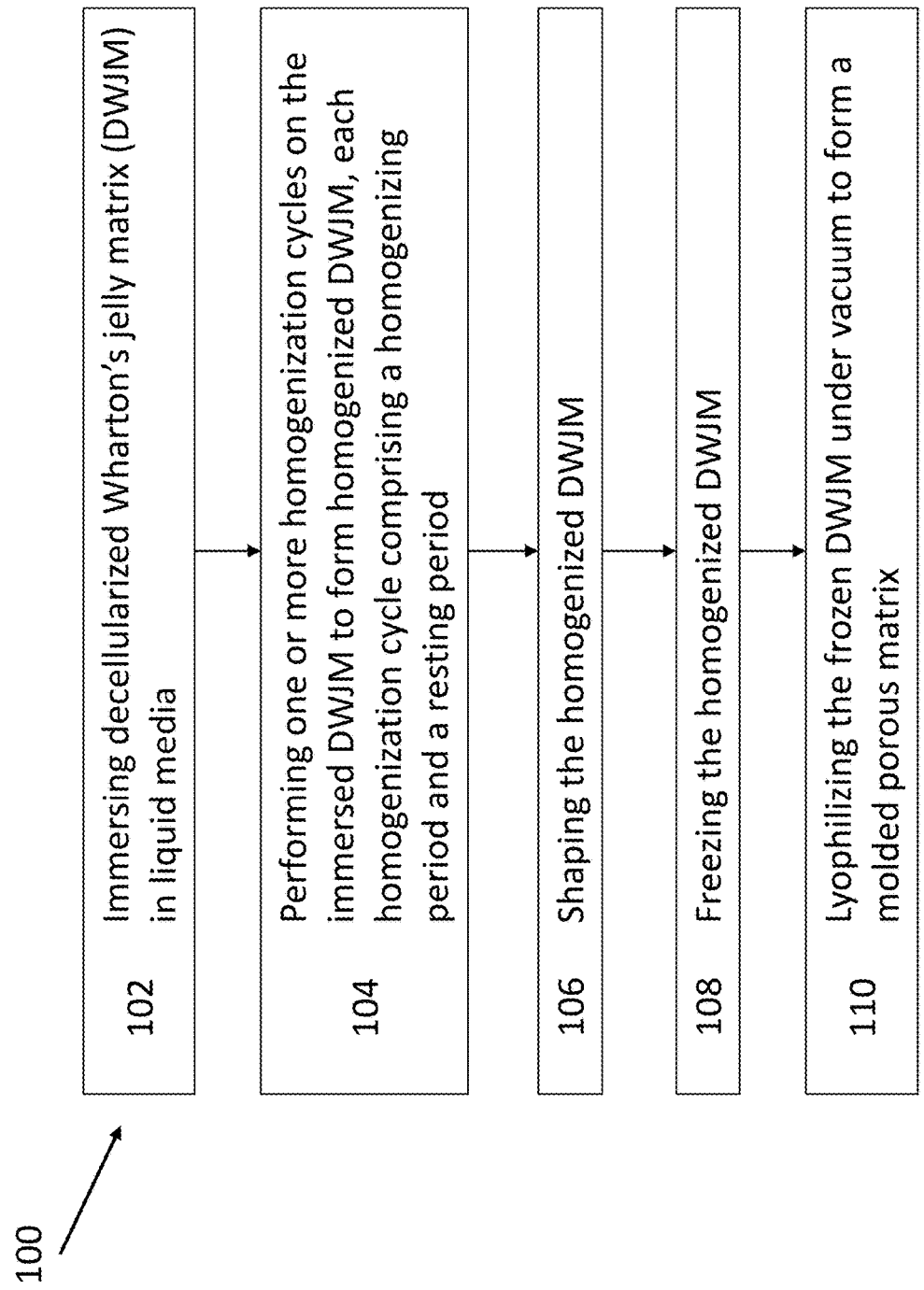
FIG. 8 is a flowchart listing the steps of an exemplary method for fabricating a bioengineered DWJM.

The present invention also relates to methods of making the bioengineered DWJM described elsewhere herein. Referring now to FIG. 8, an exemplary method 100 of making a bioengineered matrix is depicted. Method 100 begins with step 102, wherein a decellularized Wharton's jelly matrix (DWJM) is immersed in liquid media. In step 104, one or more homogenization cycles are performed on the immersed DWJM to form homogenized DWJM, wherein each homogenization cycle comprises a homogenizing period and a resting period. In step 106, the homogenized DWJM is shaped. In step 108, the homogenized DWJM is frozen. In step 110, the frozen DWJM is lyophilized under vacuum to form a bioengineered matrix.

Wharton's jelly matrix can be prepared and decellularized to form DWJM in any suitable manner (see U.S. Patent Application Publication No. 2011/0165676 and U.S. Pat. No. 9,814,802, which are each incorporated herein by reference in their entirety). For example, in various embodiments the Wharton's jelly matrix can be prepared by complete isolation from umbilical cord, by isolation with vascular structures intact, or by using whole umbilical cord. The umbilical cord can be from any suitable source, including but not limited to humans and other placental mammals, such as primates and ungulates. The Wharton's jelly matrix can be decellularized through one or more osmotic shock cycles. Osmotic shock cycles generally involve alternating exposure of Wharton's jelly matrix to a hypertonic solution and a hypotonic solution. An exemplary osmotic shock cycle comprises alternating between a hypertonic salt solution containing sodium chloride, mannitol, magnesium chloride, and potassium chloride, and a hypotonic solution containing 0.005% Triton X-100 in double distilled water for an hour incubation in each. In some embodiments, the hypotonic solution incubation can be performed under centrifugation. Further processing steps can include detergent washes, enzymatic digests, and organic solvent extraction, followed by the removal of all residual material using ion exchange beads.

DWJM can be immersed in any suitable media, such as distilled water. The amount of liquid media can control the pore size of the resulting bioengineered DWJM, wherein a higher ratio of decellularized tissue can produce a bioengineered DWJM having smaller pore sizes, and a lower ratio of decellularized tissue can produce a bioengineered DWJM having larger pore sizes. For example, a ratio of 0.5 g decellularized tissue for every 1 mL of liquid media is capable of producing bioengineered DWJM having pore sizes between about 30 μm and 80 μm.

The liquid media immersion permits the DWJM to be homogenized uniformly. Each homogenization cycle comprises a homogenizing period with a resting period to permit the DWJM solution to cool. The homogenizing step can be performed on ice to improve the rate of cooling. The homogenizing period can be between about 10 seconds and 1 minute, and the resting period can be between about 30 seconds and 5 minutes. In some embodiments, the homogenizing period is about 30 seconds and the resting period is about 120 seconds. In various embodiments, between about 10 to 100 homogenization cycles can be performed.

Homogenized DWJM can be shaped in any suitable manner. For example, in some embodiments, the homogenized DWJM can be 3D printed into any desired size and shape. The homogenized DWJM can be 3D printed with any suitable support structure, such as a casing or framework that is removable using commonly known post-processing steps. In other embodiments, the homogenized DWJM can be shaped by being loaded into any sized mold. In some embodiments, the mold is selected to have a larger, nonspecific shape, such that the final molded DWJM can be trimmed and resized to any desired shape. The shaped homogenized DWJM is frozen at a temperature of −80° C. or below for at least 8 hours. The frozen DWJM is then lyophilized at a temperature of about −20° C. and −60° C. at a vacuum of between about 0.01 mBar and 0.1 mBar for at least 8 hours.

In various embodiments, the bioengineered DWJM can be treated with a sterilization step. The sterilization step can apply any suitable sterilization method. For example, at any stage in the process of fabricating the bioengineered DWJM, the DWJM components can be treated with radiation (e.g., gamma radiation, x-ray radiation, ultraviolet sterilization, and electron beam processing), gaseous formaldehyde, carbon dioxide, ozone, ethylene oxide, peracetic acid, ethanol, hydrogen peroxide, and the like.

In some embodiments, the bioengineered DWJM can be enhanced with one or more additives. The additives can be mixed into a sample of homogenized DWJM and can facilitate the adherence and growth of cell lines. For example, the one or more additives can include one or more additional extracellular matrix material and/or blends of naturally occurring extracellular matrix material, including but not limited to collagen, fibrin, fibrinogen, thrombin, elastin, laminin, fibronectin, vitronectin, hyaluronic acid, chondroitin 4-sulfate, chondroitin 6-sulfate, dermatan sulfate, heparin sulfate, vixapatin (VP12), heparin, and keratan sulfate, proteoglycans, and combinations thereof. Some collagens that may be beneficial include but are not limited to collagen types I, II, III, IV, V, VI, VII, VIII, IX, X, XI, XII, XIII, XIV, XV, XVI, XVII, XVIII, and XIX. These proteins may be in any form, including but not limited to native and denatured forms. In various embodiments, the one or more surface treatments can include one or more carbohydrates such as chitin, chitosan, alginic acids, and alginates such as calcium alginate and sodium alginate. These materials may be isolated from plant products, humans or other organisms or cells or synthetically manufactured.

In various embodiments, the additives can include natural peptides, such as glycyl-arginyl-glycyl-aspartyl-serine (GRGDS) (SEQ ID NO. 1), arginylglycylaspartic acid (RGD) (SEQ ID NO. 2), and amelogenin. In some embodiments, the surface treatments can include sucrose, fructose, cellulose, or mannitol. In some embodiments, the additives can include nutrients, such as bovine serum albumin. In some embodiments, the additives can include vitamins, such as vitamin B2, vitamin Ad, Vitamin D, Vitamin E, and Vitamin K. In some embodiments, the additives can include nucleic acids, such as mRNA and DNA. In some embodiments, the additives can include natural or synthetic steroids and hormones, such as dexamethasone, hydrocortisone, estrogens, and its derivatives. In some embodiments, the additives can include growth factors, such as fibroblast growth factor (FGF), transforming growth factor beta (TGF-β), and epidermal growth factor (EGF). In some embodiments, the additives can include a delivery vehicle, such as nanoparticles, microparticles, liposomes, viral and non-viral transfection systems.

In various embodiments, the additives can include one or more therapeutics. The therapeutics can be natural or synthetic drugs, including but not limited to: analgesics, anesthetics, antifungals, antibiotics, anti-inflammatories, nonsteroidal anti-inflammatory drugs (NSAIDs), anthelmintics, antidotes, antiemetics, antihistamines, anti-cancer drugs, antihypertensives, antimalarials, antimicrobials, antipsychotics, antipyretics, antiseptics, antiarthritics, antituberculotics, antitussives, antivirals, cardioactive drugs, cathartics, chemotherapeutic agents, a colored or fluorescent imaging agent, corticoids (such as steroids), antidepressants, depressants, diagnostic aids, diuretics, enzymes, expectorants, hormones, hypnotics, minerals, nutritional supplements, parasympathomimetics, potassium supplements, radiation sensitizers, a radioisotope, fluorescent nanoparticles such as nanodiamonds, sedatives, sulfonamides, stimulants, sympathomimetics, tranquilizers, urinary anti-infectives, vasoconstrictors, vasodilators, vitamins, xanthine derivatives, and the like. The therapeutic agent may also be other small organic molecules, naturally isolated entities or their analogs, organometallic agents, chelated metals or metal salts, peptide-based drugs, or peptidic or non-peptidic receptor targeting or binding agents.

Methods of Using Bioengineered DWJM

The present invention also relates to methods of using the bioengineered DWJM. As described elsewhere herein, the bioengineered DWJM possess several advantageous qualities, including but not limited to a 3D structure capable of being formed to any desired shape and dimension, substantial uniformity in pore size and pore distribution, and homogenous composition of extracellular matrix components. The bioengineered DWJM is thereby well suited for a number of applications.

Cell Culture

In one aspect, the present invention encompasses methods for culturing cells. In various embodiments, the methods relate to the use of the bioengineered DWJM to support and expand one or more cell populations. The cells can be cultured in any suitable environment, including under in vivo and in vitro conditions. The cells that can be cultured using the bioengineered DWJM of the present invention can be any suitable cell. Non-limiting examples of suitable cells include pluripotent stem cells, embryonic stem cells, hematopoietic stem cells, adipose derived stem cells, bone marrow derived stem cells, fibroblasts, osteocytes, epithelial cells, cardiomyocytes, endothelial cells, neurocytes, and the like. Suitable cells can also include cancer cells, including but not limited to: leukemia, lymphoma, myeloma, breast cancer, prostate cancer, endometrial cancer, bladder cancer, brain cancer, cervical cancer, lung cancer, melanoma, cervical cancer, ovarian cancer, colorectal cancer, pancreatic cancer, esophageal cancer, kidney cancer, thyroid cancer, liver cancer, uterine cancer, soft tissue sarcoma, bone cancer, stomach cancer, and the like. In some embodiments, the bioengineered DWJM of the present invention maintain the plasticity of the cells that are seeded therein.

Cells may be isolated from a number of sources, including, for example, biopsies from living subjects and whole-organ recover from cadavers. The isolated cells can be autologous cells, obtained by biopsy from the subject intended to be the recipient. The biopsy may be obtained using a biopsy needle, a rapid action needle which makes the procedure quick and simple.

Cells may be isolated using techniques known to those skilled in the art. For example, the tissue may be disaggregated mechanically and/or treated with digestive enzymes and/or chelating agents that weaken the connections between neighboring cells making it possible to disperse the tissue into a suspension of individual cells without appreciable cell breakage. Enzymatic dissociation may be accomplished by mincing the tissue and treating the minced tissue with any of a number of digestive enzymes either alone or in combination. These include but are not limited to trypsin, chymotrypsin, collagenase, elastase, and/or hyaluronidase, DNase, pronase and dispase. Mechanical disruption may also be accomplished by a number of methods including, but not limited to, scraping the surface of the tissue, the use of grinders, blenders, sieves, homogenizers, pressure cells, or sonicators.

Once the tissue has been reduced to a suspension of individual cells, the suspension may be fractionated into subpopulations from which the cells elements may be obtained. This also may be accomplished using standard techniques for cell separation including, but not limited to, cloning and selection of specific cell types, selective destruction of unwanted cells (negative selection), separation based upon differential cell agglutinability in the mixed population, freeze-thaw procedures, differential adherence properties of the cells in the mixed population, filtration, conventional and zonal centrifugation, centrifugal elutriation (counterstreaming centrifugation), unit gravity separation, countercurrent distribution, electrophoresis and fluorescence-activated cell sorting.

Cell fractionation may also be desirable, for example, when the donor has diseases such as cancer or metastasis of other tumors to the desired tissue. A cell population may be sorted to separate malignant cells or other tumor cells from normal noncancerous cells. The normal noncancerous cells, isolated from one or more sorting techniques, may then be used for tissue reconstruction.

Isolated cells may be cultured in vitro to increase the number of cells available for seeding the bioengineered DWJM. The use of autologous cells can reduce or prevent tissue rejection typically seen with allogeneic cells. However, if an immunological response does occur in the subject after implantation of the artificial organ, the subject may be treated with immunosuppressive agents such as cyclosporin or FK506 to reduce the likelihood of rejection. In certain embodiments, chimeric cells, or cells from a transgenic animal, may be seeded onto the bioengineered DWJM.

Isolated cells may be transfected prior to coating with genetic material. Useful genetic material may be, for example, genetic sequences which are capable of reducing or eliminating an immune response in the host. For example, the expression of cell surface antigens such as class I and class II histocompatibility antigens may be suppressed. This may allow the transplanted cells to have reduced chances of rejection by the host. In addition, transfection could also be used for gene delivery.

Seeded cells may be normal or genetically engineered to provide additional or normal function. Methods for genetically engineering cells with retroviral vectors, polyethylene glycol, or other methods known to those skilled in the art may be used. These include using expression vectors which transport and express nucleic acid molecules in the cells. (See Goeddel; Gene Expression Technology: Methods in Enzymology 185, Academic Press, San Diego, Calif (1990). Vector DNA may be introduced into prokaryotic or cells via conventional transformation or transfection techniques. Suitable methods for transforming or transfecting host cells can be found in Sambrook et al. (Molecular Cloning: A Laboratory Manual, 3nd Edition, Cold Spring Harbor Laboratory press (2001)), and other laboratory textbooks.

Seeding of cells onto the bioengineered DWJM may be performed according to standard methods. For example, the seeding of cells onto polymeric substrates for use in tissue repair has been reported (see, e.g., Atala, A. et al., J. Urol. 148(2 Pt 2): 658-62 (1992); Atala, A., et al. J. Urol. 150 (2 Pt 2): 608-12 (1993)). Cells grown in culture may be trypsinized to separate the cells, and the separated cells may be seeded on the bioengineered DWJM. Alternatively, cells obtained from cell culture may be lifted from a culture plate as a cell layer, and the cell layer may be directly seeded onto the bioengineered DWJM without prior separation of the cells.

In one embodiment, a range of 1 million to 50 million cells are suspended in medium and applied to each square centimeter of a surface of a bioengineered DWJM. The bioengineered DWJM is incubated under standard culturing conditions, such as, for example, 37° C. 5% $CO_2$, for a period of time until the cells become attached. However, it will be appreciated that the density of cells seeded onto the bioengineered DWJM may be varied. For example, greater cell densities promote greater tissue regeneration by the seeded cells, while lesser densities may permit relatively greater regeneration of tissue by cells infiltrating the graft from the host. Other seeding techniques may also be used depending on the bioengineered DWJM and the cells. For example, the cells may be applied to the bioengineered DWJM by vacuum filtration. Selection of cell types, and seeding of cells onto a bioengineered DWJM, will be routine to one of ordinary skill in the art in light of the teachings herein.

In some embodiments, the bioengineered DWJM is suitable for culturing and expanding hematopoietic stem cells (HSCs). HSCs reside in the bone marrow (BM) hematopoietic "niche," a special microenvironment that regulates the HSCs self-renewal and multi-potency. The bioengineered DWJM can be used as a three-dimensional culture system that recapitulates the BM hematopoietic niche to expand and differentiate hematopoietic stem and progenitor cells (HSPC). Briefly, bioengineered DWJM can be washed with PBS and incubated in culture medium overnight. Enriched CD34+ HSPCs can then be seeded onto the bioengineered DWJM in media at 37° C. with 5% $CO_2$. The bioengineered DWJM is able to promote HSPC quiescence while maintaining their viability and clonogenic capacity. Cell adhesion to the bioengineered DWJM also increases frequency of c-kit+ HSPCs, a population with enhanced self-renewal ability. Bioengineered DWJM is able to induce the expression of CXCR4 in cells surrounding it, thereby enhancing HSPC migration toward stromal cell-derived factor-1 (SDF-1). Bioengineered DWJM is also able to upregulate megakaryocytic differentiation, cell mobility and homing, and HSC marker genes in CD34+ cells.

In some embodiments, the bioengineered DWJM is also suitable for co-culture and differentiation of HSCs, such as with mesenchymal stromal cells (MSCs). Briefly, bioengineered DWJM can be washed with PBS and incubated in culture medium overnight, as above. A population of MSCs can then be seeded into the bioengineered DWJM for two days before adding a population of enriched CD34+ HSCs. Under the same culture conditions as above, the bioengineered DWJM coupled with a population of MSCs is able to highly stimulate proliferation of HSPCs and decrease their transmigration by suppressing CXCR4 expression.

In various embodiments, the bioengineered DWJM can be used in combination with different types of cells, tissues, and matrix materials to form complex tissues and organs for transplantation or in vitro drug testing. The bioengineered DWJM can be adapted for three dimensional printing to form the complex tissues and organs.

High-Throughput Screening

In one aspect, the present invention encompasses methods for high-throughput screening of any number of drugs and therapeutics. The bioengineered DWJM is highly reproducible and can be sized and shaped to fit any suitable high-throughput testing system. In some embodiments, the bioengineered DWJM can be used to support a high-throughput cell-based assay to screen the effectiveness of a drug or therapy.

The screening methods of the present invention are not limited to the specific type of the compound. Potential test compounds include chemical agents (such as toxins), pharmaceuticals, peptides, proteins (such as antibodies, cytokines, enzymes, etc.), and nucleic acids, including gene medicines and introduced genes, which may encode therapeutic agents such as proteins, antisense agents (i.e. nucleic acids comprising a sequence complementary to a target RNA expressed in a target cell type, such as RNAi or siRNA), ribozymes, etc. Additionally or alternatively, the assays of the invention may screen a physical agent such as radiation (e.g. ionizing radiation, UV-light or heat); these can be tested alone or in combination with chemical and other agents. In one embodiment, entire compound libraries are screened. Compound libraries are a large collection of stored compounds utilized for high throughput screening. Compounds in a compound library can have no relation to one another, or alternatively have a common characteristic. For example, a hypothetical compound library may contain all known compounds known to bind to a specific binding region.

The assays of the invention may also be used to test delivery vehicles. These may be of any form, from conventional pharmaceutical formulations, to gene delivery vehicles. For example, the assays may be used to compare the effects of the same compound administered by two or more different delivery systems (e.g., a depot formulation and a controlled release formulation). They may also be used to investigate whether a particular vehicle could have effects by itself. As the use of gene-based therapeutics increases, the safety issues associated with the various possible delivery systems become increasingly important. Thus the models of the present invention may be used to investigate the properties of delivery systems for nucleic acid therapeutics, such as naked DNA or RNA, viral vectors (e.g. retroviral or adenoviral vectors), liposomes, etc. Thus the test compound may be a delivery vehicle of any appropriate type with or without any associated therapeutic agent. Non-limiting examples of delivery vehicles include polymersomes, vesicles, micelles, plasmid vectors, viral vectors, and the like.

For example, leukemia stem cells are resistant to chemotherapy and are believed to result in leukemia relapse after a patient achieves initial remission. However, leukemia cells cultured in traditional systems, i.e. suspension in media, lose their stem cell qualities. Using the bioengineered DWJM of the present invention, cancer stem cells such as leukemia stem cells can be maintained and treated with chemotherapeutic and other anti-cancer agents to screen for effectiveness against their stem cell variants. Briefly, bioengineered DWJM can be trimmed to fit within the wells of a multi-well plate, washed with PBS, and incubated in culture media in preparation for a screening assay. The prepared bioengineered DWJM can be distributed to each well of a multi-well plate, seeded with a population of acute myeloid leukemia (AML) cells, and incubated at 37° C. with 5% $CO_2$ to establish the population of AML cells in each well. Cultured in this manner, AML cells demonstrate decreased proliferation without undergoing significant differentiation, with an increase in ALDH+ populations. Chemotherapy treatment can be simulated by replacing culture media in each well with a fresh volume of culture media having a high dose of doxorubicin. AML cells cultured in the bioengineered DWJM demonstrate less apoptosis compared to AML cells in suspension, demonstrating that the bioengineered DWJM is able to maintain stem-cell qualities in AML cells to resist doxorubicin treatment. Leukemia cell attachment to the matrix has been shown to result in metabolic changes in the leukemia cells that are typically associated with leukemia cell resistance to chemotherapy.

The bioengineered DWJM can thereby be used to screen the effectiveness of anti-cancer agents in targeting one or more populations of any chemoresistant cancer stem cell cultured therein. The anti-cancer agents can include chemotherapeutic agents, anti-cell proliferation agents, radiosensitizing agents, or any combinations thereof. For example, any conventional chemotherapeutic agents of the following non-limiting exemplary classes can be screened: alkylating agents; nitrosoureas; antimetabolites; antitumor antibiotics; plant alkyloids; taxanes; hormonal agents; and miscellaneous agents. In addition, the bioengineered DWJM environment can be modified to test immune-based therapies, including but not limited to the seeding of cancer cells and T-lymphocytes to test T-cell effects on cancer.

Alkylating agents are so named because of their ability to add alkyl groups to many electronegative groups under conditions present in cells, thereby interfering with DNA replication to prevent cancer cells from reproducing. Most alkylating agents are cell cycle non-specific. In specific aspects, they stop tumor growth by cross-linking guanine bases in DNA double-helix strands. Non-limiting examples include busulfan, carboplatin, chlorambucil, cisplatin, cyclophosphamide, dacarbazine, ifosfamide, mechlorethamine hydrochloride, melphalan, procarbazine, thiotepa, and uracil mustard.

Anti-metabolites prevent incorporation of bases into DNA during the synthesis (S) phase of the cell cycle, prohibiting normal development and division. Non-limiting examples of antimetabolites include drugs such as 5-fluorouracil, 6-mercaptopurine, capecitabine, cytosine arabinoside, floxuridine, fludarabine, gemcitabine, methotrexate, and thioguanine.

Antitumor antibiotics generally prevent cell division by interfering with enzymes needed for cell division or by altering the membranes that surround cells. These agents are cell cycle non-specific. Non-limiting examples of antitumor antibiotics include dactinomycin, daunorubicin, idarubicin, mitomycin-C, and mitoxantrone.

Plant alkaloids inhibit or stop mitosis or inhibit enzymes that prevent cells from making proteins needed for cell growth. Frequently used plant alkaloids include vinblastine, vincristine, vindesine, and vinorelbine.

The taxanes affect cell structures called microtubules that are important in cellular functions. In normal cell growth, microtubules are formed when a cell starts dividing, but once the cell stops dividing, the microtubules are disassembled or destroyed. Taxanes prohibit the microtubules from breaking down such that the cancer cells become so clogged with microtubules that they cannot grow and divide. Non-limiting exemplary taxanes include paclitaxel and docetaxel.

Hormonal agents and hormone-like drugs are utilized for certain types of cancer, including, for example, leukemia, lymphoma, and multiple myeloma. They are often employed with other types of chemotherapy drugs to enhance their effectiveness. Sex hormones are used to alter the action or production of female or male hormones and are used to slow the growth of breast, prostate, and endometrial cancers. Inhibiting the production (aromatase inhibitors) or action (tamoxifen) of these hormones can often be used as an adjunct to therapy. Some other tumors are also hormone dependent. Tamoxifen is a non-limiting example of a hormonal agent that interferes with the activity of estrogen, which promotes the growth of breast cancer cells.

Miscellaneous agents include chemotherapeutics such as bleomycin, hydroxyurea, L-asparaginase, and procarbazine that can also be screened using the bioengineered DWJM.

An anti-cell proliferation agent can further be defined as an apoptosis-inducing agent or a cytotoxic agent. The apoptosis-inducing agent may be a granzyme, a Bcl-2 family member, cytochrome C, a caspase, or a combination thereof. Exemplary granzymes include granzyme A, granzyme B, granzyme C, granzyme D, granzyme E, granzyme F, granzyme G, granzyme H, granzyme I, granzyme J, granzyme K, granzyme L, granzyme M, granzyme N, or combinations thereof In other aspects, the Bcl-2 family member includes, for example, Bax, Bak, Bcl-Xs, Bad, Bid, Bik, Hrk, Bok, or combinations thereof.

In some embodiments, the caspase is caspase-1, caspase-2, caspase-3, caspase-4, caspase-5, caspase-6, caspase-7, caspase-8, caspase-9, caspase-10, caspase-11, caspase-12, caspase-13, caspase-14, or combinations thereof. In other embodiments, the cytotoxic agent is TNF-α, gelonin, Prodigiosin, a ribosome-inhibiting protein (RIP), *Pseudomonas* exotoxin, *Clostridium difficile* Toxin B, *Helicobacter pylori* VacA, *Yersinia enterocolitica* YopT, Violacein, diethylenetriaminepentaacetic acid, irofulven, Diptheria Toxin, mitogillin, ricin, botulinum toxin, cholera toxin, saporin 6, or combinations thereof.

Additional anticancer agents suitable for screening include small molecules, peptides, proteins, and synthetic compounds such as: everolimus, trabectedin, abraxane, TLK 286, AV-299, DN-101, pazopanib, GSK690693, RTA 744, ON 0910.Na, AZD 6244 (ARRY-142886), AMN-107, TKI-258, GSK461364, AZD 1152, enzastaurin, vandetanib, ARQ-197, MK-0457, MLN8054, PHA-739358, R-763, AT-9263, a FLT-3 inhibitor, a VEGFR inhibitor, an EGFR TK inhibitor, an aurora kinase inhibitor, a PIK-1 modulator, a Bcl-2 inhibitor, an HDAC inhibitor, a c-MET inhibitor, a PARP inhibitor, a PD-1 inhibitor, a Cdk inhibitor, an EGFR TK inhibitor, an IGFR-TK inhibitor, an anti-HGF antibody, an anti-CD47 antibody, an anti-GD2 antibody, an anti-EGF receptor antibody, a PI3 kinase inhibitors, an AKT inhibitor, a JAK/STAT inhibitor, immune checkpoint blockades, a checkpoint-1 or 2 inhibitor, a focal adhesion kinase inhibitor, a Map kinase kinase (mek) inhibitor, a VEGF trap antibody, pemetrexed, erlotinib, dasatanib, nilotinib, decatanib, panitumumab, amrubicin, oregovomab, Lep-etu, nolatrexed, azd2171, batabulin, ofatumumab, zanolimumab, edotecarin, tetrandrine, rubitecan, tesmilifene, oblimersen, ticilimumab, ipilimumab, gossypol, Bio 111, 131-I-TM-601, ALT-110, BIO 140, CC 8490, cilengitide, gimatecan, IL13-PE38QQR, INO 1001, IPdR1 KRX-0402, lucanthone, LY 317615, neuradiab, vitespan, Rta 744, Sdx 102, talampanel, atrasentan, Xr 311, romidepsin, ADS-100380, sunitinib, 5-fluorouracil, vorinostat, etoposide, gemcitabine, doxorubicin, liposomal doxorubicin, 5'-deoxy-5-fluorouridine, vincristine, temozolomide, ZK-304709, seliciclib; PD0325901, AZD-6244, capecitabine, L-Glutamic acid, heptahydrate, camptothecin, PEG-labeled irinotecan, tamoxifen, toremifene citrate, anastrazole, exemestane, letrozole, DES(diethylstilbestrol), estradiol, estrogen, conjugated estrogen, bevacizumab, IMC-1C11, CHIR-258,); 3-[5-(methylsulfonylpiperadinemethyl)-indolyl-quinolone, vatalanib, AG-013736, AVE-0005, pyro-Glu-His-Trp-Ser-Tyr-D-Ser(But)-Leu-Arg-Pro-Azgly-NH$_2$ x(acetate) wherein x=1 to 2.4, goserelin acetate, leuprolide acetate, triptorelin pamoate, medroxyprogesterone acetate, hydroxyprogesterone caproate, megestrol acetate, raloxifene, bicalutamide, flutamide, nilutamide, megestrol acetate, CP-724714; TAK-165, HKI-272, erlotinib, lapatanib, canertinib, ABX-EGF antibody, erbitux, EKB-569, PKI-166, GW-572016, Ionafarnib, BMS-214662, tipifarnib; amifostine, NVP-LAQ824, suberoyl analide hydroxamic acid, valproic acid, trichostatin A, FK-228, SU11248, sorafenib, KRN951, aminoglutethimide, arnsacrine, anagrelide, L-asparaginase, *Bacillus* Calmette-Guerin (BCG) vaccine, bleomycin, buserelin, busulfan, carboplatin, carmustine, chlorambucil, cisplatin, cladribine, clodronate, cyproterone, cytarabine, dacarbazine, dactinomycin, daunorubicin, diethylstilbestrol, epirubicin, fludarabine, fludrocortisone, fluoxymesterone, flutamide, gemcitabine, hydroxyurea, idarubicin, ifosfamide, imatinib, leuprolide, levamisole, lomustine, mechlorethamine, melphalan, 6-mercaptopurine, mesna, methotrexate, mitomycin, mitotane, mitoxantrone, nilutamide, octreotide, oxaliplatin, pamidronate, pentostatin, plicamycin, porfimer, procarbazine, raltitrexed, rituximab, streptozocin, teniposide, testosterone, thalidomide, thioguanine, thiotepa, tretinoin, vindesine, 13-cis-retinoic acid, phenylalanine mustard, uracil mustard, estramustine, altretamine, floxuridine, 5-deooxyuridine, cytosine arabinoside, 6-mecaptopurine, deoxycoformycin, calcitriol, valrubicin, mithramycin, vinblastine, vinorelbine, topotecan, razoxin, marimastat, COL-3, neovastat, BMS-275291, squalamine, endostatin, SU5416, SU6668, EMD121974, interleukin-12, IM862, angiostatin, vitaxin, droloxifene, idoxyfene, spironolactone, finasteride, cimitidine, trastuzumab, denileukin diftitox, gefitinib, bortezimib, paclitaxel, cremophor-free paclitaxel, docetaxel, epithilone B, BMS-247550, BMS-310705, droloxifene, 4-hydroxytamoxifen, pipendoxifene, ERA-923, arzoxifene, fulvestrant, acolbifene, lasofoxifene, idoxifene, TSE-424, HMR-3339, ZK186619, topotecan, PTK787/ZK 222584, VX-745, PD 184352, rapamycin, 40-O-(2-hydroxyethyl)-rapamycin, temsirolimus, AP-23573, RAD001, ABT-578, BC-210, LY294002, LY292223, LY292696, LY293684, LY293646, wortmannin, ZM336372, L-779,450, PEG-filgrastim, darbepoetin, erythropoietin, granulocyte colony-stimulating factor, zolendronate, prednisone, cetuximab, granulocyte macrophage colony-stimulating factor, histrelin, pegylated interferon alfa-2a, interferon alfa-2a, pegylated interferon alfa-2b, interferon alfa-2b, azacitidine, PEG-L-asparaginase, lenalidomide, gemtuzumab, hydrocortisone, interleukin-11, dexrazoxane, alemtuzumab, all-transretinoic acid, ketoconazole, interleukin-2, megestrol, immune globulin, nitrogen mustard, methylprednisolone, ibritgumomab tiuxetan, androgens, decitabine, hexamethylmelamine, bexarotene, tositumomab, arsenic trioxide, cortisone, editronate, mitotane, cyclosporine, liposomal daunorubicin, Edwina-asparaginase, strontium 89, casopitant, netupitant, an NK-1 receptor antagonists, palonosetron, aprepitant, diphenhydramine, hydroxyzine, metoclopramide, lorazepam, alprazolam, haloperidol, droperidol, dronabinol, dexamethasone, methylprednisolone, prochlorperazine, granisetron, ondansetron, dolasetron, tropisetron, pegfilgrastim, erythropoietin, epoetin alfa, darbepoetin alfa, and combinations thereof.

The bioengineered DWJM can also be combined with immune cells to screen the effectiveness of any number of immunotherapies. Immunotherapies can include T-cell vaccination, which typically involves immunization with inactivated autoreactive T cells to eliminate a cancer cell population. Another immunotherapy involves the use of a bispecific T-cell Engager (BiTE), which is an antibody designed to simultaneously bind to specific antigens on endogenous T cells and cancer cells as described herein, linking the two types of cells. In certain embodiments, the immunotherapy employs monoclonal antibodies (MAbs). MAbs stimulate an immune response that destroys cancer cells. Similar to the antibodies produced naturally by B cells, these MAbs "coat" the cancer cell surface, triggering its destruction by the immune system. For example, bevacizumab targets vascular endothelial growth factor (VEGF), a protein secreted by tumor cells and other cells in the tumor's microenvironment that promotes the development of tumor blood vessels. When bound to bevacizumab, VEGF cannot interact with its cellular receptor, preventing the signaling that leads to the growth of new blood vessels. Similarly, cetuximab and panitumumab target the epidermal growth factor receptor (EGFR), and trastuzumab targets the human epidermal growth factor receptor 2 (HER-2). MAbs that bind to cell surface growth factor receptors prevent the targeted receptors from sending their normal growth-promoting signals. They may also trigger apoptosis and activate the immune system to destroy tumor cells.

Further therapeutics that can be screened for effectiveness against cancer stem cells cultured within the bioengineered DWJM include any of the various radiation therapies currently in use. The radiation therapies can also be screened for their effect on the ECM compounds and structure provided by the bioengineered DWJM. Exemplary radiation therapies include but are not limited to: 3D conformal radiation therapy, intensity-modulated radiation therapy, brachytherapy, stereotactic radiosurgery, intensity-modulated proton therapy, and the like.

Tissue Engineering

In some embodiments, the bioengineered DWJM can be used in vivo to promote the recruitment, infiltration, and differentiation of cells. The influx and maturation of cells into the bioengineered DWJM can be used to regenerate tissue to treat defects and wounds. Wounds for which the present inventive method is useful in promoting closure include, but are not limited to, abrasions, avulsions, blowing wounds, burn wounds, contusions, gunshot wounds, incised wounds, open wounds, penetrating wounds, perforating wounds, puncture wounds, seton wounds, stab wounds, surgical wounds, subcutaneous wounds, or tangential wounds. In some embodiments, the bioengineered DWJM promotes ectodermal differentiation to regenerate the various substructures of the skin, including the sweat glands, sebaceous glands, hair follicles, and the like. The bioengineered DWJM may be secured to a wound area using sutures, adhesives, or overlaying bandages. The bioengineered DWJM may be cut to match the size of the wound, or may overlap the wound edges. In some instances the bioengineered DWJM may be shaped to penetrate into cavities formed by deep wounds. The bioengineered DWJM can also be used in mucosal injury healing, such as in surgery-related trauma and accidents.

In some embodiments, the bioengineered DWJM is applied cell-free, such that upon implantation, the bioengineered DWJM supports cell migration and proliferation from native tissue. The cell-free bioengineered DWJM can be supplemented with ECM and other cellular secretions to promote healing. In other embodiments, the bioengineered DWJM is seeded with one or more populations of cells to form an artificial tissue construct. The artificial tissue construct may be autologous, where the cell populations are derived from a patient's own tissue, or allogenic, where the cell populations are derived from another subject within the same species as the patient. The artificial organ construct may also be xenogenic, where the different cell populations are derived form a mammalian species that is different from the subject. For example the cells may be derived from organs of mammals such as humans, monkeys, dogs, cats, mice, rats, cows, horses, pigs, goats and sheep.

In some embodiments, the bioengineered DWJM is suitable for regenerating bone tissue and repairing bone defects. The bioengineered DWJM can be used as a scaffold for growth factor delivery to promote endogenous cell homing. Briefly, bioengineered DWJM can be sized to fit within a bone fracture or defect and loaded with osteogenic and angiogenic growth factors, including but not limited to bone morphogenetic protein (BMP-2) and vascular endothelial growth factor (VEGF). The site of a bone defect can be washed with saline prior to the transplantation of an appropriately sized bioengineered DWJM. The bioengineered DWJM is able to reduce or close a bone defect without inducing inflammation or an immunologic response. In some embodiments, the bioengineered DWJM is able to form new bone having typical bone morphology with noticeable marrow spaces similar to native bone.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art may, using the preceding description and the following illustrative examples, make and utilize the compounds of the present invention and practice the claimed methods. The following working examples therefore specifically point out exemplary embodiments of the present invention, and are not to be construed as limiting in any way the remainder of the disclosure.

Example 1

Bioengineered Decellularized Wharton's Jelly Derived Extracellular Matrix for High-Throughput Screening of Chemotherapy Drugs in Cancer Previous studies established a 3D stromal based model for testing acute myeloid leukemia (AML) chemoresistance, in which leukemia cells were co-cultured with primary bone marrow mesenchymal stromal cells (MSCs) seeded in a synthetic scaffold. In this model, the leukemia cells showed increased chemoresistance (Aljitawi O S et al., Leuk Lymphoma, 2014, 55(2):378-91). The extracellular matrix (ECM) was focused on next, as the ECM plays an important role in chemoresistance by enriching a leukemia subpopulation with stem cell properties. For the ECM component, decellularized Wharton's jelly matrix (DWJM) was utilized (FIG. 1A), which was previously exampled and characterized (Aljitawi O S et al., Stem Cells Dev, 2013, 22(1):18-26). Wharton's jelly is the gelatinous connective tissue of the umbilical cord that mainly supports blood vessels in umbilical cord. Its components, such as collagen, fibronectin, hyaluronic acid, and sulphated proteoglycan (Franc S et al., Placenta, 1998, 19(1):95-104; Sobolewski K et al., Biol Neonate, 1997, 71(1):11-21), also exist in the bone hematopoietic niche (Lo Celso C et al., Nature, 2009, 457(7225): 92-6).

Umbilical cords were immediately collected from consenting mothers with full-term pregnancy after normal vaginal delivery. The umbilical cord was placed in a transport solution made of Lactated Ringer's solution supplemented with penicillin 800 U/mL (Sigma-Aldrich, St. Louis, MO), streptomycin 9.1 mg/mL (Sigma-Aldrich), and amphotericin 0.25 mg/mL (Sigma-Aldrich) and immediately refrigerated at 4° C. The decellularization process was initiated within 72 hours of umbilical cord collection. Briefly, fresh human umbilical cords were transported from delivery room in a transport solution at 4° C. Umbilical cords were dissected in a laminar flow safety cabinet by separating the matrix into large oval pieces from the surrounding membranes and vascular structures. The matrix was then subjected to two cycles of osmotic shock by alternating with a hypertonic salt solution containing sodium chloride, mannitol, magnesium chloride, and potassium chloride with an osmolarity of approximately 1,257 mOsm/L and 0.005% Triton X-100 in ddH$_2$O at 5,000 rpm in centrifuge at 4° C. After two cycles of osmotic shock, the tissues were subjected to an anionic detergent (sodium lauryl) and sodium succinate (Sigma L5777), alternating with a recombinant nucleic acid enzyme (Benzonase) in buffered (Tris HCl) water for 16 hours. Following this, an organic solvent extraction with 40% ethyl alcohol was performed for 10 minutes at 5,000 rpm in centrifuge at 4° C. All of the detergent and other processing residuals were then removed utilizing ion exchange beads (IWT-TMD, Sigma; XAD-16 Amberlite beads, Sigma; and Dowel Monosphere 550A UPW beads, Supelco) in a reciprocating flow-through glass system for 30 hours at room temperature in ddH$_2$O. The decellularized matrix was cryopreserved using 10% human recombinant albumin (Novozymes) and 10% DMSO (Sigma) solution in standard RPMI media, employing a material specific computer controlled freezing profile that was developed to freeze at −1° C./minute to −180° C.

Highly reproducible DWJM disks were created by cryohomogenization followed by lyophilization. The fabrication process was applied to DWJM to produce sheets of matrix with uniform thickness and porosity. These sheets can be produced in different sizes and shapes, and can be trimmed into any shape or form. For example, by using a punch biopsy kit, uniform disks can be made to fit into 96-well plates to create a platform suitable for high-throughput screening of drugs and small molecules. In the currently applied protocol, 0.5 g tissue/mL distilled water was used to prepare the tissue concentration for the scaffold. Tissue concentration, affects the porosity of DWJM disks.

Example 2

Mass Spectrometry Comparison Between Non-Homogenized DWJM and Bioengineered DWJM FIG. 6A through FIG. 6D and FIG. 7A through FIG. 7B depict the results of mass spectrometry analysis between an exemplary 75 mg/mL section of non-homogenized DWJM and a comparably sized section of bioengineered DWJM. The section of non-homogenized DWJM can have matrix components that are several times less abundant than in the uniformly distributed bioengineered DWJM. For example, the bioengineered DWJM can have a fibrinogen gamma chain abundance ratio of between about 30 and 35, a myosin-9 abundance ratio of between 10 and 15, and a myosin-10 abundance ratio of between about 10 and 15 compared to a comparably sized section of non-homogenized DWJM. This difference is due to the inconsistency of non-homogenized DWJM, as its composition will differ between each umbilical cord it is sourced from, as well as the region of each umbilical cord it is sourced from.

Example 3

DWJM Adherence Induces Chemotherapy Resistance in Primary Acute Myeloid Leukemia by Altering Leukemia Cell Metabolism Previous studies have demonstrated that culturing leukemia cell lines in decellularized Wharton's jelly (WJ) matrix (DWJM), the gelatinous material in umbilical cord tissues, resulted in chemotherapy resistance. To reduce the variability in the biochemical composition between different parts of the WJ matrix and to optimize a 3-dimensional (3D) DWJM-based extracellular matrix (ECM) model for in vitro culture of primary acute myeloid leukemia (AML) cells, DWJM-derived porous disks were fabricated with uniform architecture and pore-size by homogenization followed by lyophilization of human DWJM. The following study examines whether DWJM disks support primary leukemia cells and result in chemotherapy resistance.

AML patient samples collected by leukapheresis were cultured in DWJM disks for one week. Non-adherent cells were first aspirated and adherent cells were separately isolated and assessed for viability, apoptosis, and colony forming unit (CFU). RNA sequencing was performed at the end of culture. Response to chemotherapy following treatment with doxorubicin was also assessed. For all studies, DWJM-adherent and non-adherent cells were compared to suspension culture controls. Metabolic pathway analyses were conducted using enzyme-linked immunosorbent assay (ELISA). One-tailed t-test was used for comparison between the groups Consistent with prior studies, adherent DWJM cells demonstrated less apoptosis (P=0.027) and greater CFU activity with larger and more dense colonies (1 vs. 4/50,000 cells, P=0.0008). Co-culture of primary AML samples with DWJM reduced doxorubicin induced cell death (P=0.047) preserving CFU activity (3.3 vs. 0.3/300,000 cells, P=0.047) compared to treatment of suspension culture cells. To understand the mechanisms by which co-culture with DWJM enhanced leukemic progenitor function and therapy resistance, RNA-Seq analyses were performed. RNA-Seq data analysis from day 7 demonstrated significant upregulation of FAM83A and MIR34A and downregulation of BPI, ZNF521, NHLH2, CD69, FKBP14, PBX1, TANC1, GRIN2b, MYO6, INHBA, SA1008, CXCL1, A1009, BLNK, MMP9, BHLHE41, and CD9 in the adherent population compared to the suspension population (adjusted P-value <0.05). Ingenuity Pathway Analysis (IPA) identified glutamate receptor signaling as the top impacted canonical pathway, suggesting differences in the predominant metabolic process between the two culture conditions. Additionally, IPA showed that FAM83A was the most upregulated molecule, while MT-TH and MT-TW were two of the most down-regulated molecules in the adherent cells. The DWJM culture condition was associated with a significant increase in lactate (P=0.020) and significant reduction in glucose (P=0.005) in culture supernatants compared to suspension controls.

The present study thereby demonstrated that DWJM disks support primary leukemia cell survival. DWJM-adherent cells demonstrated chemotherapy resistance in association with induction of glycolysis. Based on RNA Seq data, it is shown that leukemia cell adherence to DWJM upregulates FAM83A, which functions in the epidermal growth factor receptor (EGFR) signaling pathway. FAM83A is known to control PI3K-AKT-TOR signaling cascade. M-TOR, in turn is known to activate HIF-1α pathway, which regulates glycolysis (FIG. 9). Additionally, down-regulation of mitochondria-related molecules (MT-TH and MT-TW) is consistent with a switch from oxidative phosphorylation to glycolysis in the adherent cells.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A porous matrix comprising molded homogenized decellularized Wharton's jelly matrix (DWJM) having:
   a median pore size between about 200 μm and about 350 μm, and
   a pore size distribution that is no more than 50% or 17% of the median pore size.

2. The porous matrix of claim 1, wherein the median pore size is between about 230 μm and about 330 μm.

3. The porous matrix of claim 1, wherein the median pore size is about 235 μm, about 275 μm, about 290 μm, about 300 μm, about 310 μm, about 320 μm, or about 330 μm.

4. The porous matrix of claim 1, having a volumetric porosity of between about 80% and 95%.

5. The porous matrix of claim 1, further comprising a homogenous distribution of a matrix component selected from the group consisting of: collagen, fibronectin, tenascin C (TN-C), fibrillin, lumican, hyaluronic acid (HA), versican, fibrinogen gamma chain, myosin-9, myosin-10, paladin, filamin, vinculin, moesin, periostin, laminin, talin-1, and combinations thereof.

6. The porous matrix of claim 1, having a fibrinogen gamma chain abundance ratio of between about 30 and 35.

7. The porous matrix of claim 1, having a myosin-9 abundance ratio of between about 10 and 15.

8. The porous matrix of claim 1, having a myosin-10 abundance ratio of between about 10 and 15.

9. The porous matrix of claim 1, wherein the matrix is molded or trimmed to a disc shape sized to fit in a cell culture well.

10. The porous matrix of claim 1, further comprising at least one population of seeded cells.

11. The porous matrix of claim 1, further comprising at least one therapeutic agent.

12. A method of culturing hematopoietic stem cells, comprising the steps of seeding CD34+ cells onto the porous matrix of claim 1, wherein the cells maintain quiescence while cultured on the porous matrix.

13. The method of claim 12, wherein the seeded CD34+ cells have megakaryocyte lineage bias.

* * * * *